(12) United States Patent
Paglieroni

(10) Patent No.: US 9,361,352 B2
(45) Date of Patent: Jun. 7, 2016

(54) POINT PATTERN MATCH-BASED CHANGE DETECTION IN A CONSTELLATION OF PREVIOUSLY DETECTED OBJECTS

(71) Applicant: Lawrence Livermore National Security, LLC, Livermore, CA (US)

(72) Inventor: David W. Paglieroni, Pleasanton, CA (US)

(73) Assignee: Lawrence Livermore National Security, LLC, Livermore, CA (US)

(*) Notice: Subject to any disclaimer, the term of this patent is extended or adjusted under 35 U.S.C. 154(b) by 688 days.

(21) Appl. No.: 13/748,447

(22) Filed: Jan. 23, 2013

(65) Prior Publication Data

US 2014/0207810 A1 Jul. 24, 2014

(51) Int. Cl.
*G01S 13/89* (2006.01)
*G06F 17/30* (2006.01)

(52) U.S. Cl.
CPC .... *G06F 17/30592* (2013.01); *G06F 17/30575* (2013.01)

(58) Field of Classification Search
CPC ... G01S 13/89; G01S 13/90; G06F 17/30592; G06F 17/30575
USPC ......................................... 342/22, 25 R–25 F
See application file for complete search history.

(56) References Cited

U.S. PATENT DOCUMENTS

| | | | | |
|---|---|---|---|---|
| 5,321,613 A * | 6/1994 | Porter | ..................... | G01S 13/86 702/1 |
| 5,796,363 A * | 8/1998 | Mast | ........................ | G01S 7/292 342/179 |
| 5,835,054 A * | 11/1998 | Warhus | ..................... | G01S 7/292 342/179 |
| 7,576,681 B2 * | 8/2009 | Chen | ..................... | G06K 9/3241 342/175 |
| 8,760,966 B2 * | 6/2014 | Laake | ..................... | G01V 1/301 367/36 |
| 2007/0188371 A1 | 8/2007 | Callison | | |
| 2009/0024326 A1 * | 1/2009 | Young | ....................... | G01V 1/00 702/5 |
| 2009/0161946 A1 * | 6/2009 | Sato | ....................... | G06T 7/0022 382/154 |
| 2010/0310177 A1 * | 12/2010 | Xiong | .................. | G06K 9/6211 382/201 |
| 2012/0051665 A1 * | 3/2012 | Adams | .................. | G06T 7/0028 382/294 |

(Continued)

OTHER PUBLICATIONS

U.S. Appl. No. 13/219,504, filed Aug. 26, 2011, Chambers et al.

(Continued)

*Primary Examiner* — John B Sotomayor
*Assistant Examiner* — Marcus Windrich
(74) *Attorney, Agent, or Firm* — Perkins Coie LLP

(57) ABSTRACT

A method and system is provided that applies attribute- and topology-based change detection to objects that were detected on previous scans of a medium. The attributes capture properties or characteristics of the previously detected objects, such as location, time of detection, detection strength, size, elongation, orientation, etc. The locations define a three-dimensional network topology forming a constellation of previously detected objects. The change detection system stores attributes of the previously detected objects in a constellation database. The change detection system detects changes by comparing the attributes and topological consistency of newly detected objects encountered during a new scan of the medium to previously detected objects in the constellation database. The change detection system may receive the attributes of the newly detected objects as the objects are detected by an object detection system in real time.

32 Claims, 12 Drawing Sheets

(56) References Cited

U.S. PATENT DOCUMENTS

| | | |
|---|---|---|
| 2013/0082856 A1 | 4/2013 | Paglieroni et al. |
| 2013/0082857 A1 | 4/2013 | Beer et al. |
| 2013/0082858 A1 | 4/2013 | Chambers et al. |
| 2013/0082859 A1 | 4/2013 | Paglieroni et al. |
| 2013/0082860 A1 | 4/2013 | Paglieroni et al. |
| 2013/0082861 A1 | 4/2013 | Paglieroni et al. |
| 2013/0082862 A1 | 4/2013 | Paglieroni et al. |
| 2013/0082863 A1 | 4/2013 | Paglieroni et al. |
| 2013/0082864 A1 | 4/2013 | Paglieroni et al. |
| 2013/0082870 A1 | 4/2013 | Chambers et al. |
| 2013/0085982 A1 | 4/2013 | Paglieroni et al. |

OTHER PUBLICATIONS

Aliferis, I, et al., "Comparison of the diffraction stack and time-reversal imaging algorithms applied to short-range UWB scattering data," *Proc. IEEE Int. Conf. Ultra-Wideband*, Singapore, pp. 618-621, 2007.

Ammari, H. et al., "MUSIC-type electromagnetic imaging of a collection of small three-dimensional inclusions," *SIAM J. Sci. Comput.*, vol. 29, No. 2, pp. 674-709, 2007.

Ammari, H. et al,, "A MUSIC algorithm for locating small inclusions buried in a half-space from the scattering amplitude at a fixed frequency," *Multiscale Model. Simul.*, vol. 3, No. 3, pp. 597-628, 2005.

Beer, N.R. et al., "Computational system for detecting buried objects in subsurface tomography images reconstructed from multistatic ultra wideband ground penetrating radar data," *LLNL-12311*, pp. 1-11, 2010.

Belkebir, K., Bonnard, S. et al., "Validation of 2D inverse scattering algorithms from multi-frequency experimental data," *J. Electromag. Waves App.*, vol. 14:1637-1667, 2000.

Bellomo, L. et al., "Time reversal experiments in the microwave range: description of the radar and results," *Prog. Electromag. Res.*, vol. 104, pp. 427-448, 2010.

Chambers, D.H., "Target characterization using time-reversal symmetry of wave propagation," *Int. J. Mod. Phys. B*, vol. 21, No. 20, pp. 3511-3555, 2007.

Chambers, D.H. and J.G. Berryman, "Analysis of the time-reversal operator for a small spherical scatterer in an electromagnetic field," *IEEE Trans. Ant. Prop.*, vol. 52, No. 7, pp. 1729-1738, 2004.

Chambers, D.H. and J.G. Berryman, "Target characterization using decomposition of the time-reversal operator; electromagnetic scattering from small ellipsoids," *Inv. Prob.*, vol. 22, pp. 2145-2163, 2006.

Chambers, D.H. and J.G. Berryman, "Time-reversal analysis for scatterer characterization," *Phys. Rev. Lett.*, vol, 92, No. 2, pp. 023902-1-023902-4, 2004.

Chan, K.P. and Y.S. Cheung, "fuzzy-attribute graph with application to chinese character recognition," *IEEE Transactions on Systems, Man, and Cybernetics*, vol. 22, No. 1:153-160, Jan./Feb. 1992.

Chatelée, V. et al., "Real data microwave imaging and time reversal," *IEEE APS Int. Symp.*, pp. 1793-1796, 2007.

Chauveau, J. et al., "Determination of resonance poles of radar targets in narrow frequency bands," *Proc. 4th Euro. Radar Conf.*, Munich, pp. 122-125, 2007.

Cmielewski, O. et al., "A two-step procedure for characterizing obstacles under a rough surface from bistatic measurements," *IEEE Trans. Geos. Rem, Sens.*, vol. 45, No. 9, pp. 2850-2858, 2007.

Counts, T. et al., "Multistatic ground-penetrating radar experiments," *IEEE Trans. Geos. Rem. Sens.*, vol. 45, No. 8, pp. 2544-2553, 2007.

Cresp, A. et al., "Investigation of time-reversal processing for surface-penetrating radar detection in a multiple-target configuration," *Proc. 5th Euro. Radar Conf.*, Amsterdam, pp. 144-147, 2008.

Cresp, A. et al., "Time-domain processing of electromagnetic data for multiple-target detection," *Conf. Math. Mod. Wave Phen.*, pp. 204-213, 2009.

Cresp, A. et al., "Comparison of the time-reversal and Seabed imaging algorithms applied on ultra-wideband experimental SAR data," *Proc. 7th Euro. Radar Conf.*, Paris, pp. 360-363, 2010.

Daniels, D.J "Ground penetrating radar for buried landmine and IED detection," *Unexploded Ordnance Detection and Mitigation*, J. Byrnes (ed.), Spriner, pp. 89-111, 2009.

Daniels, D.J., "A review of GPR for landmine detection," *Int. J. Sens. Imag.*, vol. 7, No. 3, pp. 90-123, 2006.

Daniels, D.J., "An assessment of the fundamental performance of GPR against buried landmines," *Detection and Remediation Technologies for Mines and Minelike Targets XII*, Proc. SPIE, vol. 6553, pp. 65530G-1-55530G-15, 2007.

Daniels, D.J. et al., "Classification of landmines using GPR," *IEEE Radar '08, Proceedings*, pp. 1-6, 2008.

Devaney, A.J., "Time reversal imaging of obscured targets from multistatic data," *IEEE Trans. Ant. Prop.*, vol. 53, No. 5, pp. 1600-1619, May 2005.

Dubois, A. et al., "Localization and characterization of two-dimensional targets buried in a cluttered environment," *Inv. Prob.*, vol. 20, pp. S63-S79, 2004.

Dubois, A. et al., "Retrieval of inhomogeneous targets from experimental frequency diversity data," *Inv. Prob.*, vol. 21, pp. S65-S79, 2005.

Dubois, A. et al., "Imaging of dielectric cylinders from experimental stepped frequency data," *Appl. Phys. Lett.*, vol. 88, pp. 64104-1-164104-3, 2006.

Feng, X. and M. Sato, "Pre-stack migration applied to GPR for landmine detection," *Inv. Prob.*, vol. 20, pp. S99-S115, 2004.

Fink, M. at al., "Time-reversed acoustics," *Rep. Prog. Phys.*, vol. 63:1933-1995, 2000.

Fink, M. and C. Prada, "Acoustic time-reversal mirrors," *Inv. Prob.*, vol. 17, pp. R1-R38, 2001.

Gader, P. et al., "Detecting landmines with ground-penetrating radar using feature-based rules, order statistics, and adaptive whitening," *Trans. Geos. Rem. Sens.*, vol. 42, No. 11, pp. 2522-2534, 2004.

Gaunaurd, G.C. and L.H. Nguyen, "Detection of land-mines using ultra-wideband radar data and time-frequency signal analysis," *IEE Proc. Radar Sonar Navig.*, vol. 151, No. 5, pp. 307-316, 2004.

Gilmore, C. et al., "Derivation and comparison of SAR and frequency-wavenumber migration within a common inverse scalar wave problem formulation," *IEEE Trans. Geos. Rem. Sens.*, vol. 44, No. 6, pp. 1454-1461, 2006.

Grove, A.J. et al., "General convergence results for linear discriminant updates," *Proc. COLT 97*, ACM press, pp. 171-183, 1997.

Iakovieva, E. at al., "Multistatic response matrix of a 3-D inclusion in half space and Music imaging," *IEEE Trans. Ant. Prop.*, vol. 55, pp. 2598-2607, 2007.

Iakovieva, E. and D. Lesselier, "Multistatic response matrix of spherical scatterers and the back propagation of singular fields," *IEEE Trans. Ant. Prop.*, vol, 56, No. 3, pp. 825-833 2008.

Jofre, L. et al., "UWB tomographic radar imaging of penetrable and impenetrable objects," *Proc. IEEE*, vol. 97, No. 2, pp. 451-464, 2009.

Kuhn, H.W., "The Hungarian method for the assignment problem," *Naval Research Logistics Quarterly*, 2:83-97, 1955.

Lee, W-H. et al,, "Optimizing the area under a receiver operating characteristic curve with application to landmine detection," *IEEE Trans. Geos. Rem, Sens.*, vol. 45, No. 2, pp. 389-397, 2007.

Mast, J.E. and E.M. Johansson, "Three-dimensional ground penetrating radar imaging using multi-frequency diffraction tomography," *SPIE*, vol. 2275, pp. 196-204, 1994.

Johansson, E.M. and J. Mast, "Three-dimensional ground penetrating radar imaging using synthetic aperture time-domain focusing," *SPIE*, vol. 2275, pp. 205-214, 1994.

Micolau, G. and M. Saillard, "DORT method as applied to electromagnetic subsurface imaging," *Radio Sci.*, vol. 38, No. 3, 1038, pp. 4-1-4-12, 2003.

Micolau, G. et al., "DORT method as applied to ultrawideband signals for detection of buried objects," *IEEE Trans. Geos. Rem. Sens.*, vol. 41, No. 8,pp. 1813-1820, 2003.

Mueller, R. et al., "image Registration and Change Detection Feasibility Study with Ground Penetrating Radar," *Proc. of SPIE* 8357:83571Y-1-83571Y-9, 2012.

(56) References Cited

OTHER PUBLICATIONS

Paglieroni, D. and F. Nekoogar, "Matching random tree models of spatio-temporal patterns to tables or graphs," *IEEE Symposium on Computational Intelligence and Data Mining*, pp. 1-8, Apr. 1-5, 2007.

Paglieroni, D., and K. Ni, "DART Queries," *IEEE Transactions on Knowledge and Data Engineering, in Revision*, LLNL-JRNL-418760, 2010.

Paglieroni, D.W. et al., "DART-based threat assessment for buried objects Detected with a ground penetrating radar over time," LLNL, pp. 1-7, 2010.

Prada, C. and M. Fink, "Eigenmodes of the time reversal operator: A solution to selective focusing in multiple-target media," *Wave Motion*, vol. 20, pp. 151-163, 1994.

Ranade, S. et al., "Point Pattern Matching by Relaxation," *Pattern Recognition* 12:169-275, 1980.

Saillard, M. et al., "Reconstruction of buried objects surrounded by small inhomogeneities," *Inv. Prob.*, vol. 16, pp. 1195-1208, 2000.

Soumekh, M. et al., "3D wavefront image formation for NIITEK GPR," Radar Sensor Technology XIII Proc. SPIE, vol. 7308, pp. 73080J-1-73080J-12, 2009.

Sternlicht, D.D. et al., "Advances in Seabed Change Detection for Port and Coastal Security," *WSS Conference*, May 2012, 6 pages.

Throckmorton, C. et al., "The efficacy of human observation for discrimination and feature identification of targets measured by the NIITEK ground penetrating radar," *Detection and Remediation Technologies for Mines and Minelike Targets IX, Proc. SPIE*, vol. 5415, pp. 963-972, 2004.

Torrione, P.A. at al., "Performance of an adaptive feature-based processor for a wideband around penetrating radar system," *IEEE Trans. Aerospace Elec. Systems*, pp. 1-10, 2006.

Torrione, P.A. and L.M. Collins,"Texture features for antitank landmine detection using ground penetrating radar," *IEEE Trans. Geos. Rem. Sens.*, vol. 45, No. 7, pp. 2374-2382, 2007.

Torrione, P.A. et al "Constrained filter optimization for subsurface landmine detection," *Detection and Remediation Technologies for Mines and Minelike Targets XI, Proc. SPIE*, vol. 6217, pp. 621710X-1-621710X-12, 2006.

Torrione, P.A., Collins, L. et al., "Application of the LMS algorithm to anomaly detection using the Wichmann/NIITEK ground penetrating radar," *Detection and Remediation Technologies for Mines and Minelike Targets VIII, Proc. SPIE*, vol. 5089, pp. 1127-1136, 2003.

Tortel, H. et al., "Decomposition of the time reversal operator for electromagnetic scattering," *J. Electromag. Waves. App.*, vol. 13, pp. 687-719, 1999.

Tsai, W-H and K-S Fu, Error-Correcting isomorphisms of Attributed Relational Graphs for Pattern Analysis, *IEEE Transactions on Systems, Man, and Cybernetics*, vol. 9, No. 12, pp. 757-768, 1979.

Vitebskiy, S., Carin, L., "Resonances of perfectly conducting wires and bodies of revolution buried in a lossy dispersive half-space," *IEEE Trans. Ant. Prop.*, vol. 44, No. 12, pp, 1575-1583, 1996.

Vitebskiy, S. et al., "Short-pulse plane-wave scattering from buried perfectly conducting bodies of revolution," *IEEE Trans. Ant, Prop.*, vol. 44, No. 2, pp. 143-151, 1996.

Wilson, J.N. et al., "A large-scale systematic evaluation of algorithms using ground-penetrating radar for landmine detection and discrimination," *IEEE Trans. Geos, Rem. Sens.*, vol. 45, No. 8, pp. 2560-2572, 2007.

Yavuz, M.E. and F.L. Teixeira, "Full time-domain DORT for ultrawideband electromagnetic fields in dispersive, random inhomogeneous media," *IEEE Trans. Ant. Prop.*, vol. 54, No. 8, pp. 2305-2315, 2006.

Yavuz, M.E. and F.L. Teixeira, "On the sensitivity of time-reversal imaging techniques to model perturbations," IEEE Trans. Ant, Prop., vol. 56, No. 3, pp. 834-843, 2008.

Yavuz, M.E. and F.L. Teixeira, "Space-frequency ultrawideband time-reversal imaging," *IEEE Trans. Geos. Rem. Sens.*, vol. 46, No. 4, pp. 1115-1124, 2008.

Zhu, Q. and L.M. Collins, "Application of feature extraction methods for landmine detection using the Wichmann/NIITEK around-penetrating radar," *IEEE Trans. Geos. Rem. Sens.*, vol. 43, No. 1, pp. 81-85, 2005.

Zhuge, X. et al., "UWB array-based radar imaging using modified Kirchhoff migration," *Proc. 2008 IEEE Conf. Ultra-Wideband*, vol. 3, pp. 175-178, 2008.

\* cited by examiner

POINT PATTERN MATCH-BASED CHANGE DETECTION IN A CONSTELLATION OF PREVIOUSLY DETECTED OBJECTS

STATEMENT REGARDING FEDERALLY SPONSORED RESEARCH

The United States Government has rights in this invention pursuant to Contract No. DE-AC52-07NA27344 between the U.S. Department of Energy and Lawrence Livermore National Security, LLC, for the operation of Lawrence Livermore National Laboratory.

CROSS-REFERENCE TO RELATED APPLICATION(S)

This application is related to U.S. patent application Ser. No. 13/219,410, filed Aug. 26, 2011, entitled "REAL-TIME SYSTEM FOR IMAGING AND OBJECT DETECTION WITH A MULTISTATIC GPR ARRAY" and U.S. patent application Ser. No. 13/219,430, filed Aug. 26, 2011, entitled "DISTRIBUTED ROAD ASSESSMENT SYSTEM," which are incorporated herein by reference in their entirety.

BACKGROUND

Many scientific, engineering, medical, and other technologies seek to detect the presence of an object within a medium. For example, some technologies detect the presence of (i) buried land mines in a roadway or a field for military or humanitarian purposes, or (ii) potentially hidden explosives placed aboveground hidden among man-made clutter. Such technologies may use ultra wideband penetrating radar technologies, such as ground-penetrating radar ("GPR") antennas that are mounted on the front of a vehicle that travels down a track (e.g., a roadway or across a field). The antennas could be directed into the ground with the soil being the medium and the top of the soil or pavement being the surface. In this case, GPR systems can be used to detect not only metallic objects but also nonmetallic objects whose dielectric properties are sufficiently different from those of the soil. When a radar signal strikes a subsurface object, it is reflected back as a return signal to a receiver. Current GPR systems typically analyze the strength or amplitude of the return signals directly to identify the presence of the object. Some GPR systems may, however, generate tomography images from the return signals. In the medical field, computer-assisted tomography uses X-rays to generate tomography images for detecting the presence of abnormalities (i.e., subsurface objects) within a body. In the engineering field, GPR systems have been designed to generate spatial images of underground areas, as well as those aboveground, that may contain potentially hidden explosives, or the interior of concrete structures such as bridges, dams, and containment vessels in order to assess the integrity of the structures. In such images, the objects of interest tend to appear as distinct bright spots. In addition to referring to a foreign object that is within a medium, the term "object" also refers to any characteristic of the medium (e.g., a crack in the medium or a change in the medium's density) that is to be detected.

Some current technologies seek to detect the presence of new objects that were not detected in previous passes. For example, a convoy of military vehicles may travel over a certain roadway fairly often. If access to the roadway is not tightly controlled, the military may need to check, each time a convoy is to travel down the roadway, for the presence of land mines or other objects that may pose a hazard. As another example, a civil engineering firm may check bridges, dams, and other structures on a regular basis (e.g., yearly) for the presence of new subsurface defects (e.g., cracks). Each time the structure, roadway, or area is scanned, large amounts of data may be collected and processed. For example, the scan of the roadway may collect GPR return signals every few centimeters. GPR systems may generate image frames from the return signals and detect subsurface objects in those image frames. Successive scans of a structure or roadway will often be translationally misaligned due to GPS navigation errors. When GPR systems have access to data from previous scans of a structure or roadway, the GPR systems may detect change by (i) spatially registering misaligned images or other 2D rasters of data derived from GPR return signals on the current scan to images or other 2D rasters from previous scans, and (ii) comparing the co-registered images or rasters. This approach requires a potentially large database of images or rasters derived from GPR return signals acquired on previous scans.

Current operational penetrating radar systems do not use the results from previous scans to perform change detection for objects in real-time. A major hurdle in achieving this goal is that the cost of storing the vast amounts of data collected from previous scans and comparing data from those previous scans to the latest scan may be very high. A real-time system needs to process the return signals from successive sampling locations of the vehicle as it proceeds down track so that, in the steady state, the return signals for one sampling location are processed within the time between samplings. Moreover, in the case of a vehicle that detects land mines, a real-time system may need to detect the presence of the land mine in time to stop the vehicle before it reaches the land mine.

DETAILED DESCRIPTION

Figure 1:
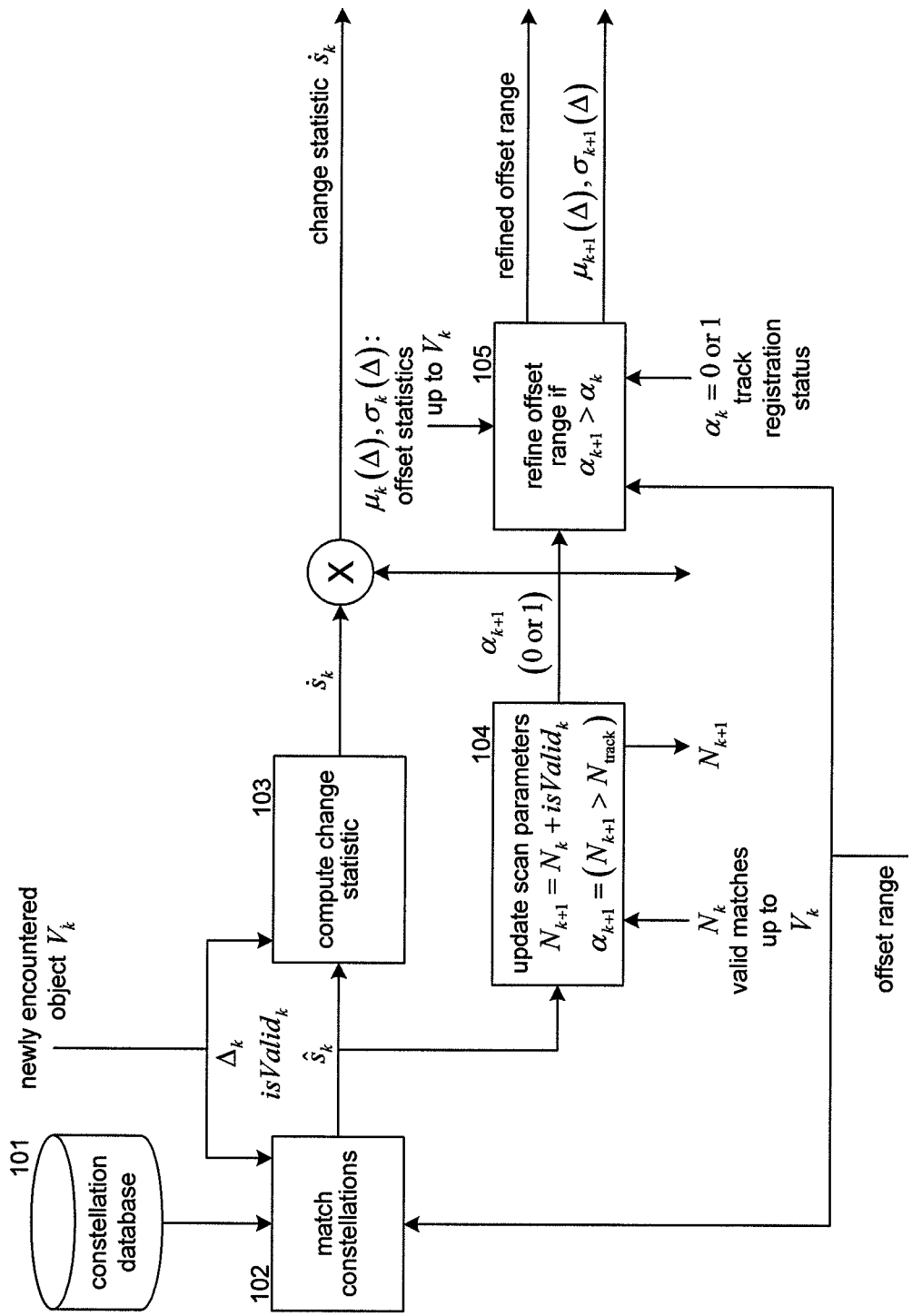
FIG. 1 is a block diagram that illustrates the processing of real-time change detection in some embodiments.

A method and system is provided that applies attribute- and network topology-based change detection to objects that were detected on previous scans of a medium such as a structure, roadway, or area of interest. The attributes capture properties or characteristics of the previously detected objects, such as location, time of detection, detection strength, size, elongation, orientation, etc. The locations define a three-dimensional network topology or constellation of previously detected objects. In some embodiments, the change detection system stores the attributes of the previously detected objects in a constellation database. The change detection system detects changes by comparing the attributes and topological consistency of newly detected objects encountered during a new scan of the medium to the previously detected objects in the constellation database. The change detection system may receive the attributes of the newly detected objects as the objects are detected by an object detection system in real time. The object detection system may use conventional detection techniques or use the techniques described in U.S. patent application Ser. No. 13/219,410, entitled "REAL-TIME SYSTEM FOR IMAGING AND OBJECT DETECTION WITH A MULTISTATIC GPR ARRAY," filed on Aug. 26, 2011, which is hereby incorporated by reference. The change detection system may also update the constellation database based on the attributes of the newly detected objects so that the constellation database represents attributes that are aggregated for objects repeatedly detected across multiple scans of the medium.

In some embodiments, the change detection system performs change detection in real time as newly detected objects from a new constellation are detected on the current scan by the object detection system. When a newly detected object is encountered, the change detection system performs point pattern matching to find the best match between newly detected objects from the new constellation and previously detected objects from the previous constellation that are within a local match range of the newly encountered object. If the point pattern matching indicates that no previously detected object corresponds to the newly encountered object, the change detection system indicates that the newly encountered object represents a change from the previous constellation. If the point pattern matching indicates that a previously detected object corresponds to the newly encountered object and the attributes are similar, the change detection system indicates that the corresponding objects match. If, however, the attributes are not similar, the change detection system also indicates a change from the previous constellation.

In some embodiments, when performing point pattern matching, the change detection system takes into account differences in the paths of travel or tracks used during a scan of a medium. The change detection system may assume that because of differing paths that the locations of the newly detected objects are offset in the x (cross-track) and y (down-track) directions from the locations of the previously detected objects. When performing point pattern matching, the change detection system seeks to find a constellation offset that results in the best match as defined by a matching objective function. To find the best match, the change detection system evaluates how well the objects within a local match range of a newly encountered object match assuming each possible initial correspondence between a newly detected object and a previously detected object. For example, if there are 11 newly detected objects and 10 previously detected objects in the local match range of possible matches, then there are 110 initial correspondences—one for each pairing of a newly detected object with a previously detected object. To evaluate how well the constellations match for each initial correspondence, the change detection system sets the constellation offset to the difference between the locations of the objects of that initial correspondence. The change detection system then generates a point pattern matching score from the matching objective function to indicate how well the objects in the local match range align given the constellation offset of that initial correspondence. The change detection system selects the constellation offset that results in the best matching score as the best constellation offset for matching the new constellation and the previous constellation within the local match range.

In some embodiments, to generate a point pattern matching score for a constellation offset, the change detection system generates a best object matching score for each newly detected object within the local match range. The best object matching score for a newly detected object indicates how well the newly detected object matches a previously detected object given the constellation offset. To generate the best object matching score for a newly detected object, the change detection system may generate an object matching score between each previously detected object and the newly detected object and select the object matching score that indicates the best match. If a newly detected object and the previously detected object that best matches satisfy a match criterion, then the change detection system designates the objects as matching or corresponding objects. The change detection system may set the point pattern matching score to an average of the best object matching scores for the newly detected objects In some embodiments, given the best match of the new constellation and the previous constellation, the change detection system determines whether that match results in a previously detected object that corresponds to the newly encountered object. If no previously detected object corresponds to the newly encountered object, then the change detection system indicates that a new object has been detected that is not in the previous constellation. If a previously detected object does correspond to the newly encountered object, then the change detection system generates a change statistic based on the attributes of the newly encountered object and the corresponding previously detected object. If the change statistic satisfies a change criterion, then the change detection system signals a change between the previous constellation and the new constellation.

In some embodiments, to speed up processing, the change detection system may use various criteria to limit searches for point pattern matches to only those that are likely to result in the best point pattern match. The change detection system may only evaluate point pattern matching for initial correspondences when the objects of the pair satisfy a distance criterion (e.g., are within an offset range). For example, if the newly detected object and the previously detected object of the pair are farther apart in the down-track direction or cross-track direction than an offset range, the change detection system assumes that the objects do not match and avoids evaluating the match of the constellations that assume the initial correspondence of the pair. As newly detected objects are encountered, the change detection system may refine the offset range based on the best constellation offsets generated from the newly detected objects that have already been encountered to reflect a learned offset range between the newly detected objects and the previously detected object resulting from a difference in scan paths. As the offset range is narrowed, the initial correspondences for additional pairs of objects will not be within the refined offset range and the evaluation of point pattern matches for those additional pairs will be avoided.

In some embodiments, the change detection system updates the previous constellation after the current scan has been completed. The change detection system performs a coarse point pattern matching for all the newly detected objects using a coarse offset range, and then refines the offset range based on the best constellation offsets. The change detection system then performs a refined point pattern matching for all the newly detected objects using the refined offset range. When the change detection system finds a match for a newly detected object during the refined point pattern matching, the change detection system updates the attributes of the matching previously detected object in the constellation database. The change detection system may set the new value of an attribute to an average of the previous values and the current value.

The ability of the change detection system to operate in real time depends on the computational cost associated with point pattern matching for a localized set of newly detected objects to the previously detected objects that were detected over a larger or overlapping spatial area. The objects may be represented as vertices V with locations of $x(V) \triangleq \{x_k(V)\}_{k=0}^{n-1}$ in n=3 dimensional constellation space. A constellation is stochastic when relative uncertainties in object locations are modeled using proximity likelihoods $p_k(x_k|\varepsilon_k)$ with relative uncertainty parameters $\varepsilon \triangleq \{\varepsilon_k \geq 0\}_{k=0}^{n-1}$. The set of newly detected objects may be represented as $\Omega_1 \triangleq \{V_{i_1}\}_{i_1=0}^{m_1-1}$ where $m_1$ represents the number of newly detected objects. The set of newly detected objects with a constellation offset may be represented as $\Omega_1(\Delta)$ where $\Delta \triangleq [\Delta_0 \ldots \Delta_{n-1}]$ represents the constellation offset in constellation space. The point pattern matching algorithm for change detection seeks to match the newly detected objects $\Omega_1$ to the subset $\Omega_0 \triangleq \{U_{i_0}\}_{i_0=0}^{m_0-1}$ of $m_0$ previously detected object with respect to translational offset within a localized region that contains $\Omega_1$. The point pattern matching problem between $\Omega_0$ and $\Omega_1$ may be represented as $$\phi(\Omega_0, \Omega_1) = \max_{\Delta} \phi(\Omega_0, \Omega_1(\Delta)) \qquad (1)$$

where $\phi(\Omega_0,\Omega_1)$ represents the best point pattern match score between the previous constellation $\Omega_0$ and the new constellation $\Omega_1$ over all translational offsets, $\phi(\Omega_0,\Omega_1(\Delta))$ represents the point pattern match score between the previous constellation $\Omega_0$ and the new constellation $\Omega_1$ at translational offset $\Delta$ (i.e., $\Omega_1(\Delta)$), and $\phi(\Omega_0,\Omega_1(\Delta))$ may be defined as $$\phi(\Omega_0, \Omega_1(\Delta)) = \begin{cases} \frac{1}{m_1} \sum_{i_1=0}^{m_1-1} \phi_{i_1}(\Omega_0, \Omega_1(\Delta)) & \Delta \in R(\Delta_{min}, \Delta_{max}) \\ 0 & \text{otherwise} \end{cases} \qquad (2)$$

where point pattern matches between two sets of objects are allowed within the offset range $\Delta \in R(\Delta_{min}, \Delta_{max}) \triangleq \{\Delta: \Delta_{k,min} \leq \Delta_k \leq \Delta_{k,max}\ k=0 \ldots n-1\}$. The change detection system seeks to maximize the objective function $\phi(\Omega_0,\Omega_1(\Delta))$ with respect to $\Delta$. The point pattern matching algorithm may be customized or modified for change detection in constellations of previously detected objects by requiring the contributions to the objective function in Equations 1 and 2 to take into account detection strengths and a probabilistic uncertainty model for object locations. In particular, $\phi_{i_1}(\Omega_0,\Omega_1(\Delta))$ may be based on detection statistics $s(V) \geq 0$ for objects V, the normalized proximity likelihood $$\tilde{p}(x|\varepsilon) = \min_{k=0 \ldots n-1} \frac{p_k(x_k|\varepsilon_k)}{\max_{x_k} p_k(x_k|\varepsilon_k)} \in [0, 1] \qquad (3)$$

and a match criterion function $q(s(V_0),s(V_1))$ for pairs of objects $V_0$ and $V_1$ as represented by the following:

$$\phi_{i_1}(\Omega_0, \Omega_1(\Delta)) = \max_{i_0=0 \ldots m_0-1} \tilde{p}(x(U_{i_0}) - x(V_{i_1}) - \Delta|\varepsilon) \cdot q(s(U_{i_0}), s(V_{i_1})) \qquad (4)$$

where q expresses criteria important for strong matches, but has little effect on the computational cost of point pattern matching. Some choices for $q(s(\phi_{i_0}),s(V_{i_1}))$ include the constant 1, the product of the detection strengths $s(U_{i_0}) \cdot s(V_{i_1})$, and the detection strength of the previously detected object $s(U_{i_0})$. The first choice emphasizes the topological consistency between $\Omega_0$ and $\Omega_1$, the second choice emphasizes the spatial cross-correlation in detection strengths between the objects from $\Omega_0$ and $\Omega_1$ that correspond, and the third choice emphasizes strong topological matches with previously detected objects with a high detection strength even though a newly detected object may have a low detection strength as follows:

$$q(s(U_{i_0}),s(V_{i_1}))=q(s(U_{i_0})=s(U_{i_0}) \qquad (5)$$

The criterion function for the third choice may be more robust than a purely topological criterion function because it takes detection strength into account. The criterion function for the third choice may also be more robust than topological cross-correlation because the spatial distribution of detections strengths in $\Omega_0$ is based on observations from multiple scans over time, and may be more reliable than the distribution of detection strengths in $\Omega_1$ that are based on observations from only one scan.

The computational cost of point pattern matching may be analyzed assuming that $m_0 \geq m_1 > 0$ (if $m_0 < m_1$, the roles of $\Omega_0$ and $\Omega_1$ in the development below can be interchanged). Exhaustive point pattern matching between $\Omega_0$ and $\Omega_1$ has $O(_{m_0}P_{m_1})$ combinatorial time complexity. In this case, when computing the match between two candidate sets of objects, an offset may be applied to one set so that the centroids for each set are coincident. A more efficient polynomial time point pattern matching algorithm may be developed by computing $\phi(\Omega_0,\Omega_1(\Delta))$ at offsets $\Delta$ limited to the range of admissible offsets constrained by the $m_0 m_1$ possibilities that force the initial correspondences of pairs from $\Omega_0$ and $\Omega_1$ to be coincident. The general objective function in Equation 1 can thus be replaced by the objective function $$\phi(\Omega_0, \Omega_1) = \max \phi(\Omega_0, \Omega_1(\Delta)) \qquad (6)$$

$$\Delta = x(U_{i_0}) - x(V_{i_1}):$$

$$i_0 = 0 \ldots m_0 - 1$$

$$i_1 = 0 \ldots m_1 - 1$$

$$\Delta \in R(\Delta_{min}, \Delta_{max})$$

for relaxation matching, where $\phi_{i_1}(\Omega_0,\Omega_1(\Delta))$ in Equation 4 has $O(m_0)$ time complexity, and $\phi(\Omega_0,\Omega_1(\Delta))$ in Equation 2 has $O(m_0 m_1)$ time complexity. Thus, $\phi(\Omega_0,\Omega_1)$ in Equation 6 has $O(mm_0m_1)$ time complexity, where the number of offsets $\Delta$ in Equation 6 is $0<m<m_0m_1$. The solution to Equation 6 thus has a worst-case 4th order polynomial time complexity of $O(m_0^2m_1^2)$. However, for $\Omega_0$ and $\Omega_1$, if the separation between objects is much greater than the range of admissible offsets (as can be the case for change detection), then there will be $O(1)$ objects on average from $\Omega_0$ that lie within offset range $R(\Delta_{min},\Delta_{max})$ of each object in $\Omega_1(\Delta)$. In such a case, $m=O(m_1)$ and the relaxation matching solution to Equation 6 can be modified for change detection in constellations of previously detected objects such that it reduces to worst-case $O(m_0m_1^2)$ 3rd order polynomial time complexity.

The change detection system captures the spatial topology and detection strengths of preexisting clutter along a specific path between two points or within an area of interest as a collection of buried objects (i.e., previously detected objects) and stores them in a constellation database. Clutter accounts for rocks, man-made debris, previously placed objects, holes in the road, etc. The constellation database may store the information for the previously detected objects in a database table with a row for each object and a column for each attribute. The attributes may include detection location $x(V)$, detection strength (i.e., detection statistic) $s(V)>0$, times $[t_0(V), t_1(V)]$ at which the object was first and last observed, and the number of times $n(V)$ that the object has been observed. The attributes can be extended to include various geometry features for buried object detections (size/area/volume, extent in 3D, orientation in 3D, etc.). For stochastic constellations, certain attributes are treated as random variables, such as the parameters of proximity likelihoods that model relative uncertainties in object location, and they are maintained in the database as additional attributes.

The change detection system may generate the constellation database for a specific path or area off-line from one or more contributing scans (also referred to as tracks), where a track is a pass over a path or area of interest, for example, with a vehicle-mounted GPR antenna array. The object detection system that interfaces with the change detection system may generate detections from a sequence of subsurface images reconstructed from GPR return signals. Successive images lie in vertical planes that are parallel to the front of the vehicle and separated by $\Delta_y$ meters in the down-track direction (e.g., $\Delta_y=2$ cm). The object detection system may remove residual energy from each reconstructed image in a post-processing step. Each post-processed image has an associated feature vector that describes the energy and centroid location of the dominant bright spot that has been extracted using image segmentation. The object detection system then derives a nonnegative detection statistic from the energy of the dominant spot in each image. Each track thus has an associated time series of feature vectors containing a detection statistic. The object detection system may apply a peak filter to the sequence of detection statistics to produce a new time series for which the distance down-track between non-zero detection statistic values is at least $\Delta_p$ meters.

In some embodiments, the change detection system uses an uncertainty model for newly detected object locations that assumes the newly detected objects from track T are all offset relative to ground truth by $\Delta_T \pm \in = \{\Delta_{T,k} \pm \in_k\}_{k=0}^{n-1}$. The absolute uncertainty component $\Delta_T$ can vary from track to track. After removing absolute errors in the locations of objects from different tracks, the change detection system models the remaining relative uncertainty in location between objects using a proximity likelihood $p(x|\in)$ whose relative uncertainty parameter $\in$ is the same for objects across all tracks. The change detection system may track offsets of up to $\Delta_{T,E}=\Delta_{T,N}=3$ m in easting and northing relative to ground truth by default. The change detection system may also use relative uncertainties of $\in_E=\in_N=\in_D=0.5$ m for easting, northing, and depth by default. The change detection system may use a peak filter with a half width of $$\Delta_p > (\in_E^2 + \in_N^2)^{1/2} \qquad (7)$$

to avoid ambiguities in the point pattern matches produced while generating the database. By default, the change detection system may use $\Delta_p=0.71$ m (which is $\gtrsim(\in_E^2+\in_N^2)^{1/2}$ for $\in_E=\in_N=0.5$ m).

In some embodiments, the change detection system initializes the offset $\Delta$ of newly detected objects from the current track relative to the constellation database to zero at the beginning of the track. For point pattern matching, the set $\Omega_0$ of previously detected objects that a newly encountered object V will be matched to is the subset of Q within an east-north oriented square of half-width $R_{match}$ of V. The set $\Omega_1$ of newly detected objects that will be matched to the database contains the newly encountered object V and all the newly detected objects within down-track distance $R_{match}$ of V. The change detection system uses point pattern matching to determine the offset $\Delta'$ of $\Omega_1$ relative to $\Omega_0$ within some specified offset range $\Delta' \in R(\Delta_{min},\Delta_{max})$. The point pattern match between $\Omega_0$ and $\Omega_1$ is valid if the number of object correspondences that were found is greater than or equal to $N_{valid}$. In order to increase the likelihood of a valid match, the change detection system may select the number as follows:

$$N_{valid} << R_{match}/\Delta_p \qquad (8)$$

The change detection system may use $N_{valid}=5$ by default. If a point pattern match is valid, the change detection system replaces offset $\Delta$ by offset $\Delta'$. The change detection system selects the previously detected object that corresponds to the newly encountered object V as the object $U \in \Omega_0$ that maximizes $\tilde{p}(x(U)-x(V)-\Delta|\in) \cdot q(s(U))$ in Equation 4. If the object U does not exist, then a new object has been encountered and the change detection system adds the newly encountered object V to the constellation database. Otherwise, the change detection system updates the previously detected object U with the newly encountered object V. If the database was initially empty, the contributing track does not backtrack on or cross over itself, and the objects are separated by much more than $(\in_E^2+\in_N^2)^{1/2}$, then $\Omega_0 \cap \Omega_1 = \Omega_1$ with V at offset $\Delta$ are removed. More generally, $\Omega_1$ will tend to resemble a subset of $\Omega_0$ with the newly encountered object V added. The change detection system may use update equations as follows:

$$s(U) = [n(U)s(U)+s(V)]/[n(U)+1] \qquad (9)$$

$$x(U) = [n(U)x(U)+x(V)+\Delta]/[n(U)+1]$$

$$t_0(U) = \begin{cases} t(V) & n(U)=0 \\ \min[t_0(U),t(V)] & n(U)>0 \end{cases}$$

$$t_1(U) = \begin{cases} t(V) & n(U)=0 \\ \max[t_1(U),t(V)] & n(U)>0 \end{cases}$$

$$n(U) = n(U)+1$$

The change detection system may modify the constellation database in either an initialize mode or an update mode of operation. The change detection system initially generates the constellation database from the first contributing track in initialize mode. This mode defines the refined admissible range of down-track and cross-track offsets for the track as the relative uncertainty of the locations of objects along the track. The change detection system modifies the constellation database with subsequent information from contributing tracks in update mode. In update mode, the change detection system refines the admissible range of down-track and cross-track offsets for each track by registering that track with the constellation database. Once a refined range of admissible offsets has been established for a contributing track, the change detection system updates the constellation database with each newly detected object in succession.

The change detection system uses the initialize mode when a database is being generated for the first time from the first contributing track. The change detection system treats this track as a reference for all subsequent contributing tracks and assumes that the first track has zero absolute error relative to ground truth. However, in accordance with the track uncertainty model, the change detection system may assume a modest relative uncertainty of $\{\pm\in_k\}_{k=0}^{n-1}$ between the locations of points even on the reference track. The change detection system uses the update mode when an existing database is being updated with additional tracks. The change detection system makes two passes over each additional track. The first pass registers the track to the database. The change detection system reduces a relatively wide initial range $R(\Delta_{min}, \Delta_{max}) \triangleq [\Delta_{E,min}, \Delta_{E,max}] \times [\Delta_{N,min}, \Delta_{N,max}]$ of admissible down-track and cross-track offsets relative to the database to a more narrow refined offset range $R(\tilde{\Delta}_{min}, \tilde{\Delta}_{max})$ by registering the track to the database, that is, by computing the global offset of the track relative to the database that maximizes some appropriate measure of the match. Because of this refinement, the change detection system will compute offsets on the second pass that are less likely to be locally inconsistent.

The change detection system may derive a more narrow range of admissible offsets from the median $\mu(\Delta) \triangleq [\mu_E(\Delta), \mu_N(\Delta)]$ and standard deviation $\sigma(\Delta) = \triangleq [\sigma_E(\Delta), \sigma_N(\Delta)]$ of optimal down-track (E) and cross-track (N) offsets within the initial offset range for valid point pattern matches over all newly detected objects:

$$\tilde{\Delta}_{E,min} = \max[\Delta_{E,min}, \mu_E(\Delta) - \max[\in_E, \sigma_E(\Delta)]]$$

$$\tilde{\Delta}_{N,min} = \max[\Delta_{N,min}, \mu_N(\Delta) - \max[\in_N, \sigma_N(\Delta)]]$$

$$\tilde{\Delta}_{E,max} = \max[\Delta_{E,max}, \mu_E(\Delta) - \max[\in_E, \sigma_E(\Delta)]]$$

$$\tilde{\Delta}_{N,max} = \max[\Delta_{N,max}, \mu_N(\Delta) - \max[\in_N, \sigma_N(\Delta)]] \quad (10)$$

The change detection system may register a track to the database only if the number of valid point pattern matches over all newly detected object is $\geq N_{track}$ (e.g., $N_{track} = 20$ by default). The change detection system may be unable to register a track to the constellation database, for example, when there is insufficient overlap between the track and the constellation database. When track registration is not possible, the change detection system may set $-\tilde{\Delta}_{E,min} = \tilde{\Delta}_{E,max} = \in_E$ and $-\tilde{\Delta}_{N,min} = \tilde{\Delta}_{N,max} = \in_N$.

The change detection system generates a change statistic to indicate whether a newly encountered object represents a change in the constellation database. As described above, the object detection system derives the detection time series of samples $s_k \geq 0$ from successive vertical plane GPR images at locations separated by $\Delta_y$ along the track. The detection time series is peak filtered, so when $\Delta_p >> \Delta_y$, only a small fraction of the detection statistics will be nonzero. The change detection system obtains a change statistic $\dot{s}_k$ by applying a penalty factor to the difference between $s_k$ and its predicted value. The change statistic time series is strictly bound by the detection time series (i.e., $0 \leq \dot{s}_k \leq s_k \forall k$) when the penalty factor varies from zero to one. If $V_k$ represents a newly encountered object for some detection time series sample $s_k > 0$ and the corresponding previously detected object from the constellation database has been identified, then the detection statistic value of $\hat{s}_k > 0$ for that previously detected object is an estimate of the detection strength that should have been observed along the track. The change detection system may use a change statistic $0 \leq \dot{s}_k \leq \max(0, s_k - \hat{s}_k)$ for the newly encountered object $V_k$ as a penalized version of the most basic measure $s_k - \hat{s}_k$ of absolute change as $$\dot{s}_k = p(s_k, \hat{s}_k)(s_k - s_k) \quad (11)$$

where the penalty function $p(s_k, \hat{s}_k)$ varies from zero to one and $p(s_k, \hat{s}_k) = 0$ for $s_k \leq \hat{s}_k$. The penalty function may be represented as:

$$p(s_k, \hat{s}_k) = \begin{cases} 0 & s_k \leq \hat{s}_k \\ 1 & s_k > \hat{s}_k \end{cases} \quad (12)$$

to satisfy these constraints and lead to the change statistic as follows:

$$\dot{s}_k = \max(0, s_k - \hat{s}_k) \quad (13)$$

Figure 3:
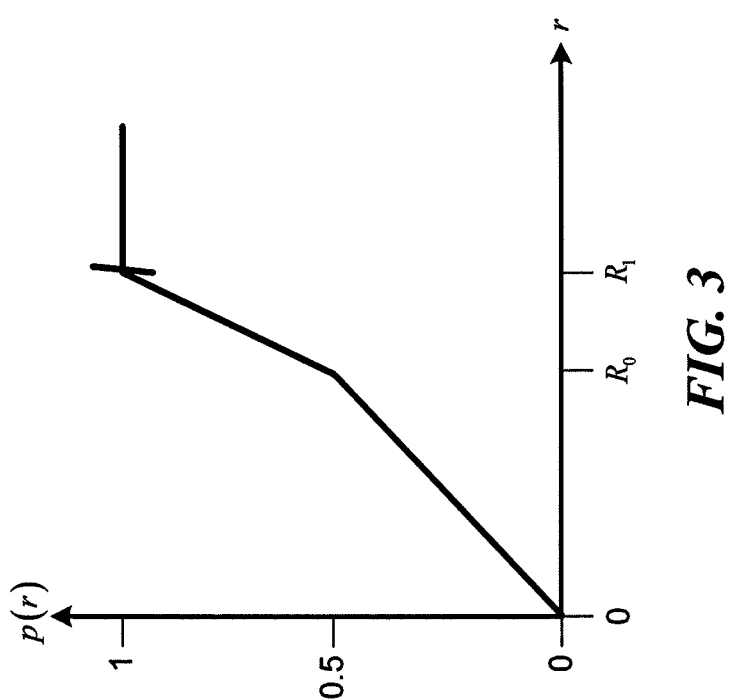
FIG. 3 illustrates a penalty function for a change statistic.

The penalty function in Equation 12 is discontinuous. Also, even when there is no significant change, the change statistic $\dot{s}_k$ in Equation 13 will tend to be unusually large when $s_k$ is unusually large because $|s_k - \hat{s}_k|$ and $\hat{s}_k$ tend to correlate. To avoid these problems, the change detection system may use a continuous penalty function defined as follows:

$$p(s_k, \hat{s}_k) = p(r_k), r_k \triangleq (s_k - \hat{s}_k)/\hat{s}_k \quad (14)$$

where $r_k$ represents the ratio between absolute change in detection statistic and predicted detection statistic. The change detection system may use a continuous non-decreasing penalty function $p(r)$ that varies from zero to one for which $p(r) = 0$ for $r \leq 0$ and $p(r) > 0$ for $r > 0$. FIG. 3 illustrates a penalty function for a change statistic. The penalty function is a piecewise linear ramp $p(r)$ with critical ratios (r values) of $R_0$ and $R_1$. The penalty function of FIG. 3 leads to a penalty factor p of $$p = 0 \text{ for } s_k - \hat{s}_k \leq 0, \quad (i)$$

$$0 < p < 0.5 \text{ for } 0 < s_k - \hat{s}_k > R_0 \hat{s}_k, \quad (ii)$$

$$p = 0.5 \text{ for } s_k - \hat{s}_k = R_0 \hat{s}_k, \quad (iii)$$

$$p > 0.5 \text{ accelerating toward 1 for } R_0 \hat{s}_k < s_k - \hat{s}_k < R_1, \quad (iv)$$

and $$p = 1 \text{ for } s_k - \hat{s}_k \geq \hat{s}_k. \quad (v)$$

The change detection system may use $0.5 < R_0 < R_1$ and $(R_0, R_1) = (0.75, 1)$ by default.

FIG. 1 is a block diagram that illustrates the processing of real-time change detection in some embodiments. The real-time change detection employs a constellation database 101, a "match constellation" component 102, a "compute change statistic" component 103, a "update scan parameters" component 104, and a "refine offset range" component 105. The constellation database includes an entry for each object detected on a previous scan. Each entry includes various attributes for a previously detected object such as location, strength of detection, number of detection or encounters, date of last detection, size of object, and so on. The "match constellation" component receives each newly encountered object $V_k$, performs point pattern matching for the newly encountered object $V_k$ and outputs an estimate of the best offset $\Delta_k$ relative to the constellation locally, an indication isValid$_k$ of whether a valid match between the constellations was found based on the number of matching objects, and a detection strength $\hat{s}_k$. The "compute change statistic" component generates a change statistic $\dot{s}_k$. The "update scan parameters" component tracks the number $N_k$ of valid point pattern matches for the current scan and sets a flag $\alpha_{k+1}$ indicating that the number of valid matches for the current scan has exceeded a valid match threshold $N_{track}$, which indicates that the scan is now believed to be registered or translationally aligned with the constellation database. The "refine offset range" component recursively updates the median $\mu_k(\Delta)$ and median deviation $\sigma_k(\Delta)$ of point pattern match offsets computed up to $V_k$ with the offset computed for $V_{k+1}$ to produce $\mu_{k+1}(\Delta)$ and $\sigma_{k+1}(\Delta)$ until the scan is registered the constellation database. The refined offset range and updated statistics are fed back for change detection processing of the next newly encountered object.

Figure 2:
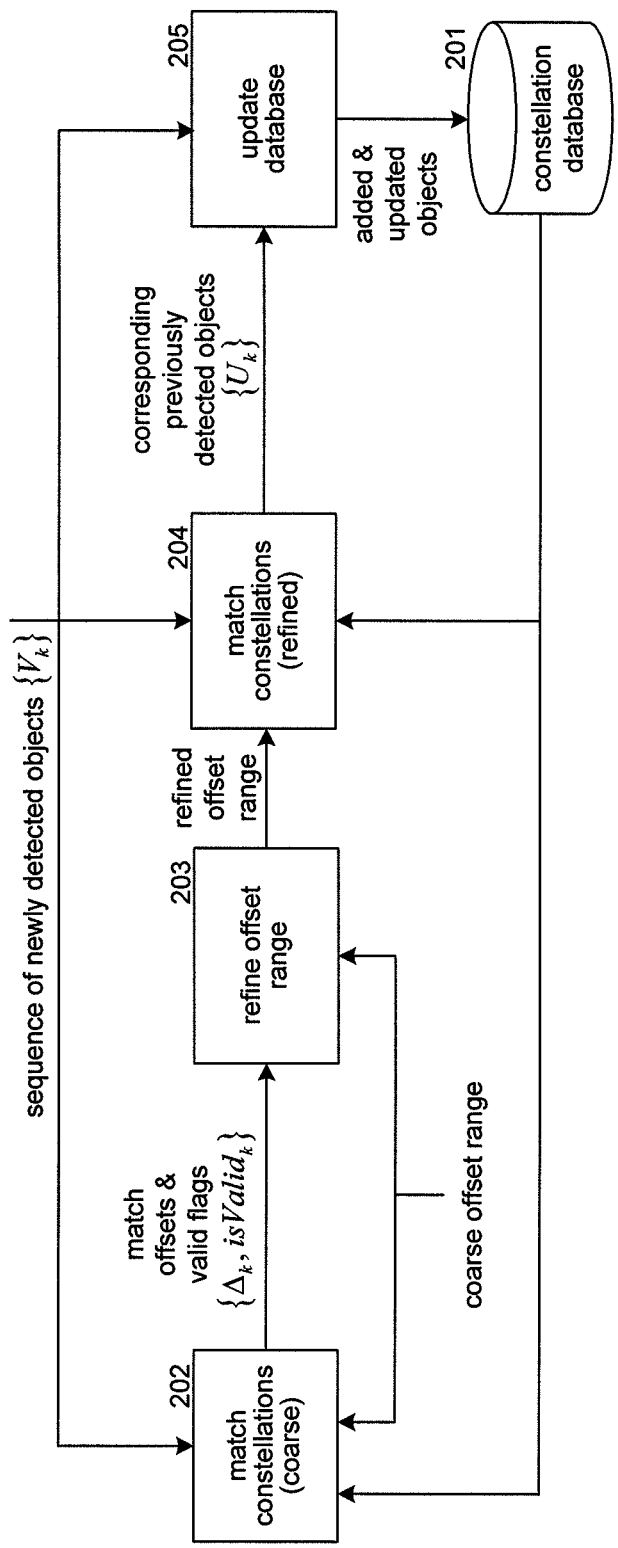
FIG. 2 is a block diagram that illustrates the processing of the constellation database updating component based on a new scan in some embodiments.

FIG. 2 is a block diagram that illustrates the processing of a constellation database updating component based on a new scan in some embodiments. The "constellation database updating" component employs a constellation database 201, a "match constellations (coarse)" component 202, a "refine offset range" component 203, a "match constellations (refined)" component 204, and an "update database" component 205. The "match constellations (coarse)" component receives a sequence of newly detected objects $\{V_k\}$ and performs point pattern matching for each of the newly detected objects using a coarse offset range to generate a sequence of best constellation offsets $\Delta_k$ and match validity flags isValid$_k$. The "refine offset range" component refines the coarse offset range based on the best constellation offsets and generates a refined offset range. The "match constellations (refined)" component receives the sequence of newly detected objects $\{V_k\}$ and performs point pattern matching for each newly detected object using the refined offset range to identify the previously detected object $U_k$ that corresponds to each newly detected object. The "update database" component receives an indication of the previously detected object that matches each newly detected object and updates the constellation database entry for that previously detected object. If no previously detected object is indicated as matching, the update component adds an entry to the constellation database for the newly detected object.

Figure 4:
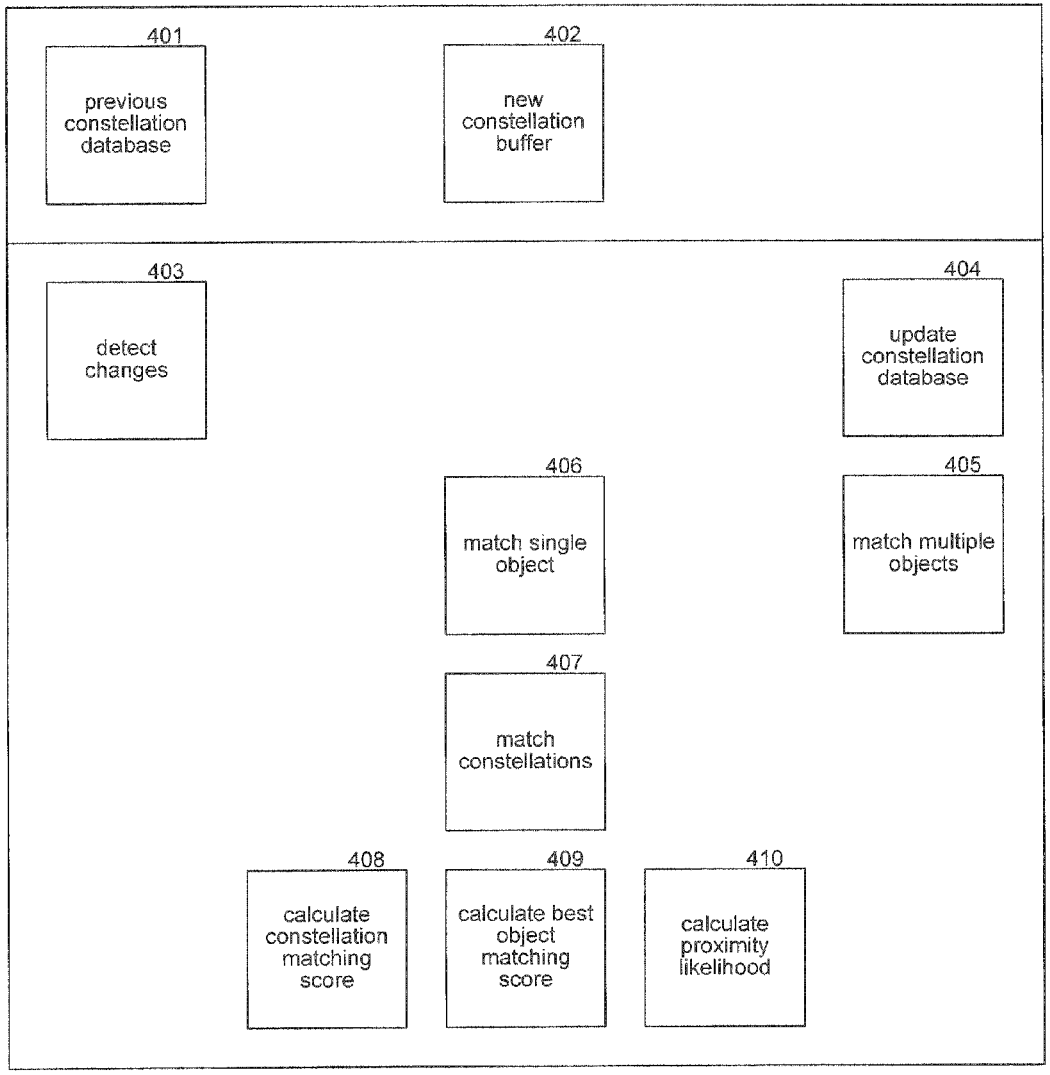
FIG. 4 is a block diagram that illustrates components of the change detection system in some embodiments.

FIG. 4 is a block diagram that illustrates components of the change detection system in some embodiments. The change detection system 400 includes a previous constellation database 401, a new constellation buffer 402, a "detect changes" component 403, an "update constellation database" component 404, a "match multiple objects" component 405, a "match single object" component 406, a "match constellations" component 407, a "calculate constellation matching score" component 408, a "calculate best object matching score" component 409, and a "calculate proximity likelihood" component 410. The previous constellation database includes an entry for each previously detected object, and the new constellation buffer includes an entry (maintained in computer memory as the vehicle moves down-track) for each newly detected object within $R_{match}$ of the current location along the track on the most recent scan. The "detect changes" component controls the detection of changes in real time by invoking the "match single object" component for each newly detected object. The "update constellation database" component performs coarse point pattern matching by invoking the "match multiple objects" component within a coarse offset range, refines the offset range, and performs refined point pattern matching by invoking the "match multiple objects" component within the refined offset range. The "match multiple objects" component invokes the "match single object" component for each newly detected object in the new constellation buffer. The "match single object" component finds the best matching of previously detected objects to a newly detected object by invoking the "match constellations" component. The "match constellations" component identifies the best constellation offset by invoking the "calculate constellation matching score" component to generate a point pattern matching score for pairs of patterns that include newly and previously detected objects. The "calculate constellation matching score" component invokes the "calculate best object matching score" component to calculate the best object matching score for each newly detected object. The calculate best object matching score uses a proximity likelihood factor to generate a likelihood that a newly detected object and a previously detected object match based on their locations.

The computing devices on which the change detection system may be implemented may include a central processing unit and memory and may include, particularly in the case of a system management workstation, input devices (e.g., keyboard and pointing devices), output devices (e.g., display devices), and storage devices (e.g., disk drives). Computer-readable media include computer-readable storage media and data transmission media. The computer-readable storage media include memory and other storage devices that may have recorded upon or may be encoded with computer-executable instructions or logic that implement the change detection system. The data transmission media is media for transmitting data using signals or carrier waves (e.g., electromagnetism) via a wire or wireless connection. Various functions of the change detection system may also be implemented on devices using discrete logic or logic embedded as an application-specific integrated circuit. The change detection system may be implemented on a computer system that is local to a vehicle to which a linear array of penetrating radar antennas has been mounted for processing the return signals locally. Alternatively, one or more of the components may be implemented on a computer system that is remote from the linear array. In such an alternative, the data used by the various components (e.g., return signals and image frames) may be transmitted between the local computing system and remote computer system and between remote computing systems.

The change detection system may be described in the general context of computer-executable instructions, such as program modules, executed by one or more computers or other devices. Generally, program modules include routines, programs, objects, components, data structures, and so on that perform particular tasks or implement particular abstract data types. Typically, the functionality of the program modules may be combined or distributed as desired in various embodiments.

Depending on the available primary storage (e.g., memory) of the computer system, the change detection system may store the entire previous constellation and the new constellation in primary storage. If the available primary storage is not sufficient to store the entire previous constellation, the change detection system may store the previous constellation in secondary storage (e.g., solid-state or disk drive). When the previous constellation is stored in secondary storage, the change detection system loads portions of the previous constellation into primary storage as needed for constellation matching. During a scan, the down-track travel distance $d_{track}$ is initialized to zero and incremented by $\Delta_y$. Each time an object is detected, the previously detected objects within a matching radius of $R_{match}$ meters east and north of that newly detected object are needed. Since the overhead of accessing secondary storage (i.e., querying the database) each time an object is detected may be too high to ensure efficient constellation database generation or change detection in real-time, the change detection system in some embodiments caches in primary storage a portion of the previously detected objects. The cached portion includes those previously detected objects needed for point pattern matching based on not only the most-recently detected object but also objects that may be detected within a certain down-track distance. The change detection system loads the needed portions into primary storage by making occasional queries to the database. Each query retrieves the set Q of vertices within a query radius of $R_{query} \geq k_{match}$ meters east and north of the current location. The change detection system queries the database if the database has not yet been queried or $d_{track} \geq R_{query} - R_{match}$. After each query, the change detection system re-initializes $d_{track}$ to zero. For example, assume $R_{query}$ is 1000 and $R_{match}$ is 50, if the change detection system last queried the database at down-track location 10,000, the change detection system will not need to query the database until down-track location 10,950 (i.e., 10,000+(1000−50)). The change detection system can use such caching regardless of the direction or curvature of the track. If $R_{query}$, is greater than the track length and the computer system has sufficient primary storage, the entire previous constellation will be cached. In some embodiments, the change detection system uses $R_{match}$=50 m and $R_{query}$=500 m by default.

Figure 5:
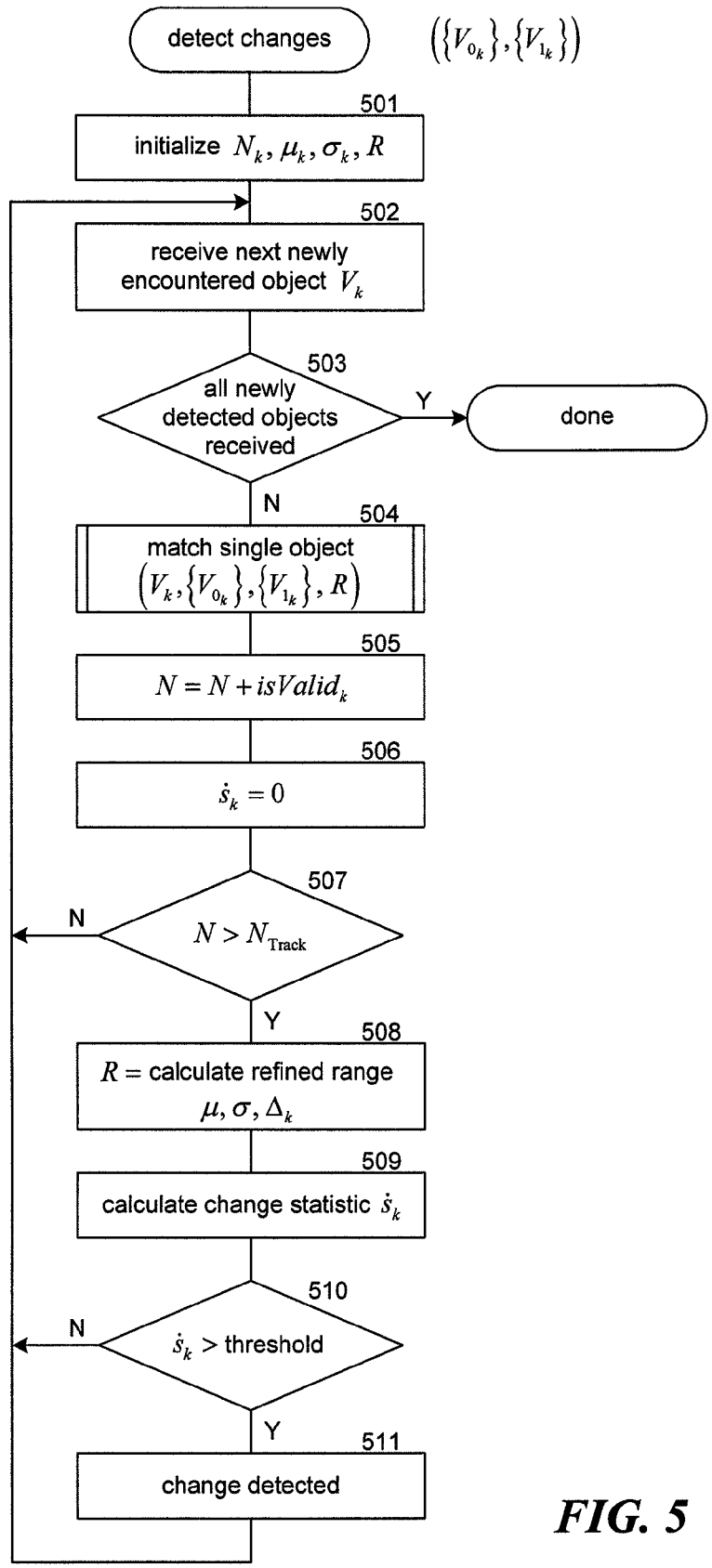
FIG. 5 is a flow diagram that illustrates the "processing of the detect changes" component of the change detection system in some embodiments.

FIG. 5 is a flow diagram that illustrates the processing of the detect changes component of the change detection system in some embodiments. The component is invoked to perform change detection in real time. The component is passed an indication of the previous constellation and a buffer for storage of the new constellation. In block 501, the component initializes the count of valid point pattern matches, offset statistics, and the offset range. In blocks 502-511, the component loops through the process where it is determined whether each newly detected object represents a change. In block 502, the component receives the newly encountered object. In decision block 503, if all the objects have already been received and processed, then the component completes, else the component continues at block 504. In block 504 the component invokes the "match single object" component passing an indication of the newly detected objects that have been received, including the newly encountered object, the previous constellation, and the offset range, and receives in return an indication of whether a point pattern match was found and, if so, a best constellation offset and indication of the corresponding previously detected object (if any). In block 505, the component increments the count of valid point pattern matches if the point pattern match was valid. In block 506, the component initializes a detection statistic. In decision block 507, if the number of valid matches is greater than the threshold number of valid matches, then the scan is registered to the constellation database and the component continues at block 508, else the component loops to block 502 to receive the next newly encountered object. In block 508, the component calculates a refined offset range based on the offset statistics from the first $N_{track}$ valid point pattern matches along the track. In block 509, the component calculates the change statistic for the newly detected object. In decision block 510, if the change statistic satisfies a threshold criterion, then the component continues at block 511, else the component loops to block 502 to receive the next newly encountered object. In block 511, the component indicates that a change has been detected and loops to block 502 receive the next newly encountered object.

Figure 6:
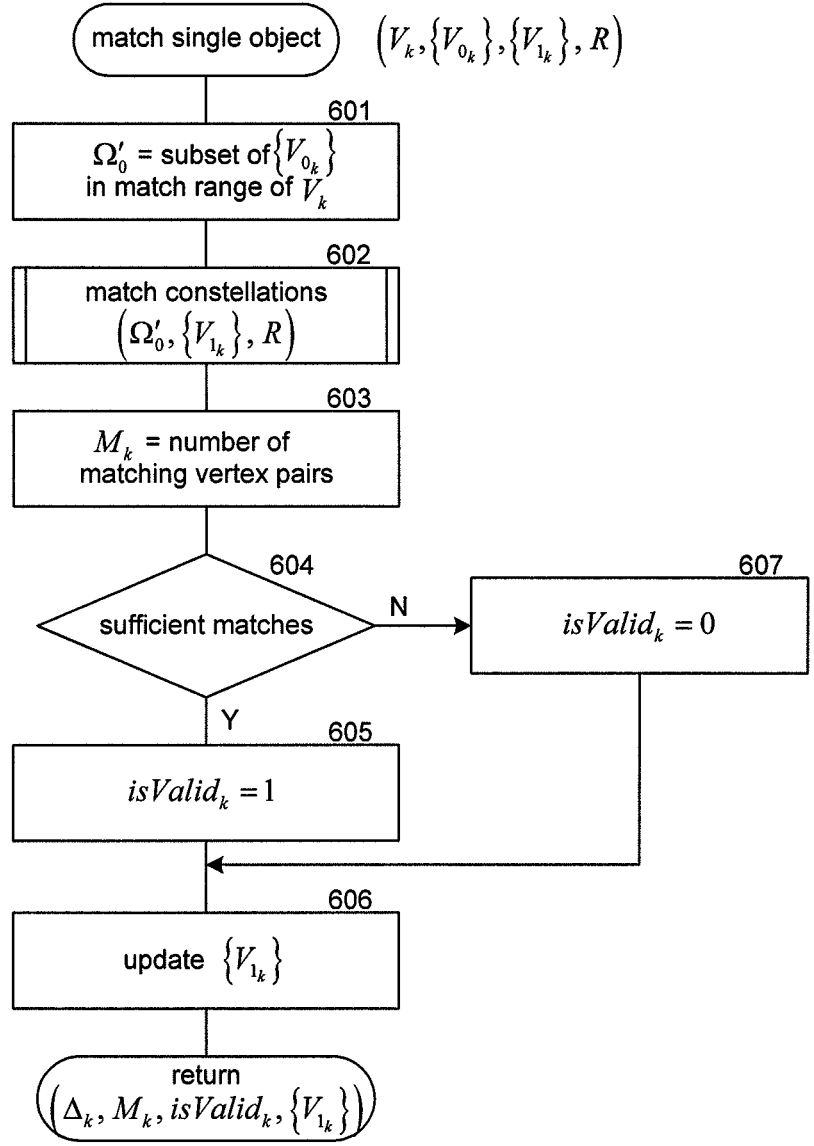
FIG. 6 is a flow diagram that illustrates the processing of the "match single object" component of the change detection system in some embodiments.

FIG. 6 is a flow diagram that illustrates the processing of the "match single object" component of the change detection system in some embodiments. The component is passed an indication of the newly detected objects that includes the newly encountered object, a new constellation of nearby objects detected on the most recent pass (maintained in computer memory as the vehicle proceeds down-track), the constellation of objects detected on previous passes, and an offset range. It returns an indication of whether the point pattern match was valid, the best constellation offset, an indication of the previously detected object (if any) that corresponds to the newly encountered object, and the updated new constellation. In block 601, the component identifies the subset of the previously detected objects that are within a match range of the newly encountered object. In block 602, the component invokes the match constellations component passing an indication of the identified sets of previously detected objects and newly detected objects and the offset range and receives in return an indication of the best point pattern matching score, the best constellation offset, and the previously detected object that corresponds to the newly encountered object. In block 603, the component sets the number of newly detected objects that match previously detected objects. In decision block 604, if the number of object matches is sufficient to have a valid point pattern match, then the component continues at block 605, else the component continues at block 607. In block 605, the component sets a flag indicating that the point pattern match was valid. In block 606, the component updates the new constellation and then returns. In block 607, the component sets a flag indicating that the point pattern match was not valid and then continues at block 606.

Figure 7:
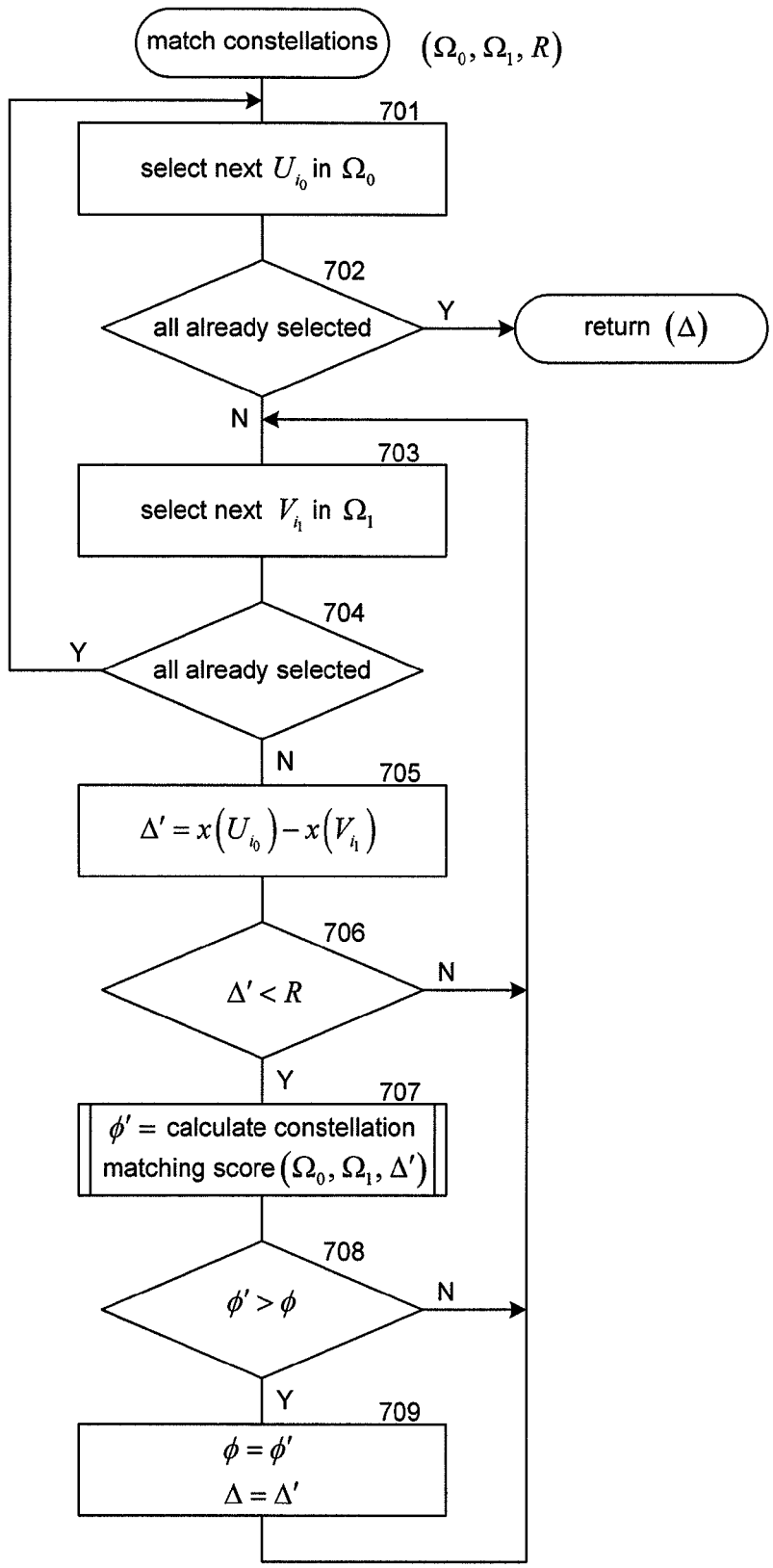
FIG. 7 is a flow diagram that illustrates the processing of the "match constellations" component of the change detection system in some embodiments.

FIG. 7 is a flow diagram that illustrates the processing of the "match constellations" component of the change detection system in some embodiments. It is an expression of relaxation matching customized for change detection in constellations of previously detected objects. The component is passed an indication of a previous constellation, a new constellation, and an offset range and returns an indication of the best constellation offset. The component loops, selecting each possible pair that includes a previously detected object and a newly detected object as an initial correspondence and calculating a point pattern matching score based on that initial correspondence. In block 701, the component selects the next previously detected object. In decision block 702, if all of the previously detected objects have already been selected, then the component returns an indication of the best constellation offset, else the component continues at block 703. In block 703, the component selects the next newly detected object. In decision block 704, if all of the newly detected objects have already been selected for the selected previously detected object, then the component loops to block 701 to select the next previously detected object, else the component continues at block 705. In block 705 the component calculates the offset between the selected previously detected object and the selected newly detected object. Decision block 706 customizes relaxation matching for constellation-based change detection such that if the offset is within the offset range, then the component continues at block 707, else the component loops to block 703 to select the next newly detected object. In block 707, the component invokes the calculate "constellation matching score" component, passing along the previous constellation, the new constellation, and the offset and receives in return a point pattern matching score. In decision block 708, if the point pattern matching score is greater than the best point pattern matching score generated so far, then the component continues at block 709, else the component loops to block 703 to select the next newly detected object. In block 709, the component sets the best point pattern matching score and the best constellation offset and then loops to block 703 to select the next newly detected object.

Figure 8:
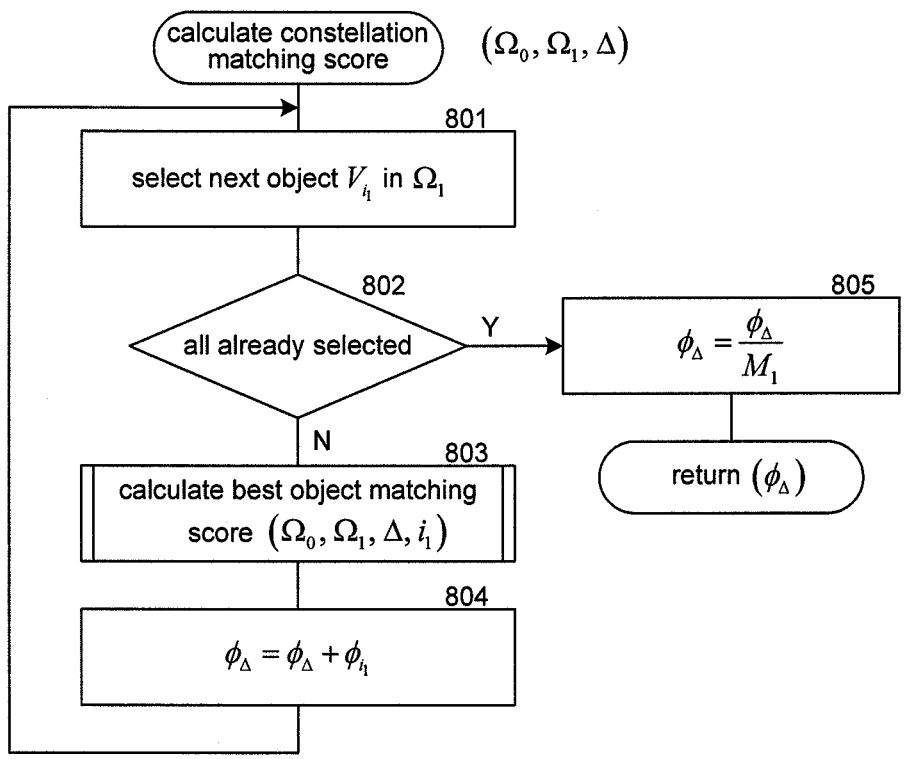
FIG. 8 is a flow diagram that illustrates the processing of the "calculate constellation matching score" component of the change detection system in some embodiments.

FIG. 8 is a flow diagram that illustrates the processing of the calculate constellation matching score component of the change detection system in some embodiments. The component is passed a previous constellation, a new constellation, and an offset and returns a point pattern matching score for that offset. The component loops, selecting each newly detected object and calculating a best object matching score for that object. In block 801, the component selects the next newly detected object. In decision block 802, if all of the newly detected objects have already been selected, then the component continues at block 805, else the component continues at block 803. In block 803, the component invokes the "calculate best object matching score" component, passing along the previous constellation, the new constellation, the offset, and n indication of the selected newly detected object. In block 804, the component updates a running total of the best object matching scores and then loops to block 801 to select the next newly detected object. In block 805, the component calculates the average of the best object matching scores and then returns.

Figure 9:
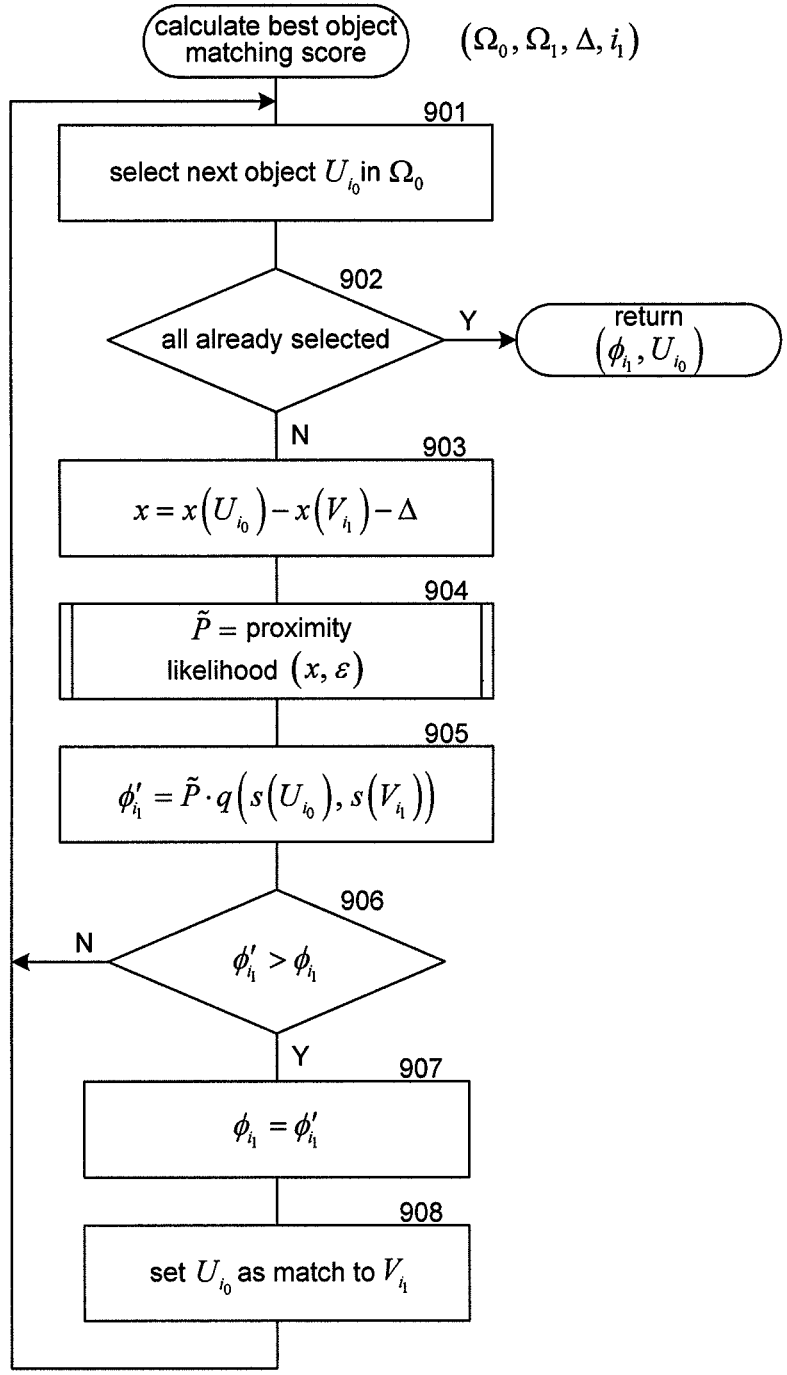
FIG. 9 is a flow diagram that illustrates the processing of the "calculate best object matching score" component of the change detection system in some embodiments.

FIG. 9 is a flow diagram that illustrates the processing of the "calculate best object matching score" component of the change detection system in some embodiments. This component further customizes relaxation matching by realizing an objective function suitable for constellation-based change detection. The component is passed an indication of the previous constellation, a new constellation, an offset, and an identification of a newly detected object. The component calculates the best object matching score for that newly detected object and returns the score along with an indication of the best matching previously detected object. In blocks 901-908, the component loops, selecting each previously detected object. In block 901, the component selects the next previously detected object. In decision block 902 if all the previously detected objects have already been selected, then the component returns an indication of the best object matching score and the matching object, else the component continues at block 903. In block 903, the component calculates the distance between the newly detected object and the selected previously detected object in each dimension factoring in the offset. In block 904, the component invokes the calculate proximity likelihood component to generate a likelihood that the objects match based on the difference in locations. In block 905, the component calculates an object matching score between the newly detected object and the selected previously detected object. In decision block 906, if the object matching score is greater than the best object matching score generated so far, then the component continues at block 907, else the component loops to block 901 and selects the next previously detected object. In block 906, the component sets the best object matching score to the object matching score. In block 907, the component indicates that the selected previously detected object matches the newly detected object and then loops to block 901 to select the next previously detected object.

Figure 10:
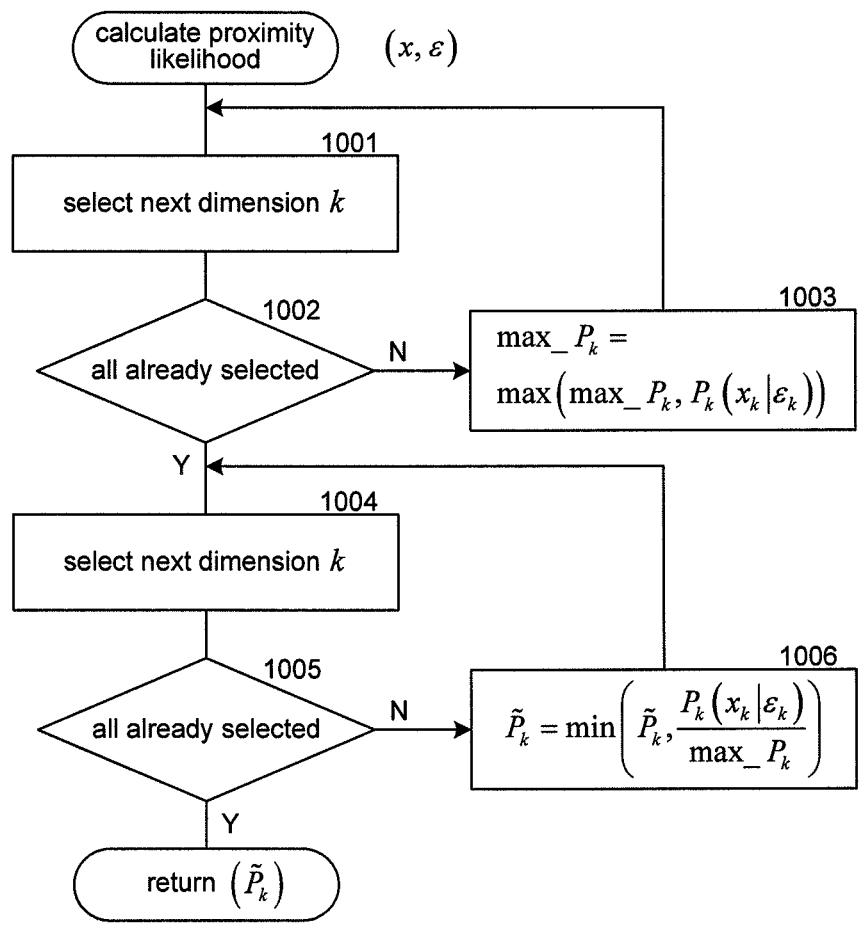
FIG. 10 is a flow diagram that illustrates the processing of the "calculate proximity likelihood" component of the change detection system in some embodiments.

FIG. 10 is a flow diagram that illustrates the processing of the "calculate proximity likelihood" component of the change detection system in some embodiments. The component is passed an indication of the differences in the dimensions and returns an indication of the likelihood that based on their locations, the objects represent matching objects. In block 1001, the component selects the next dimension. In decision block 1002, if all the dimensions have already been selected, then the component continues at block 1004, else the component continues at block 1003. In block 1003, the component sets the maximum likelihood to the greater of the likelihood for the selected dimension and the maximum likelihood generated so far and loops to block 1001 to select the next dimension. In block 1004, the component selects the next dimension. In decision block 1005, if all of the dimensions have already been selected, then the component returns the likelihood, else the component continues at block 1006. In block 1006, the component sets the likelihood to the minimum of the likelihood calculated over each spatial dimension processed so far and the likelihood of the selected dimension divided by the maximum likelihood, and then loops to block 1004 to select the next dimension.

Figure 11:
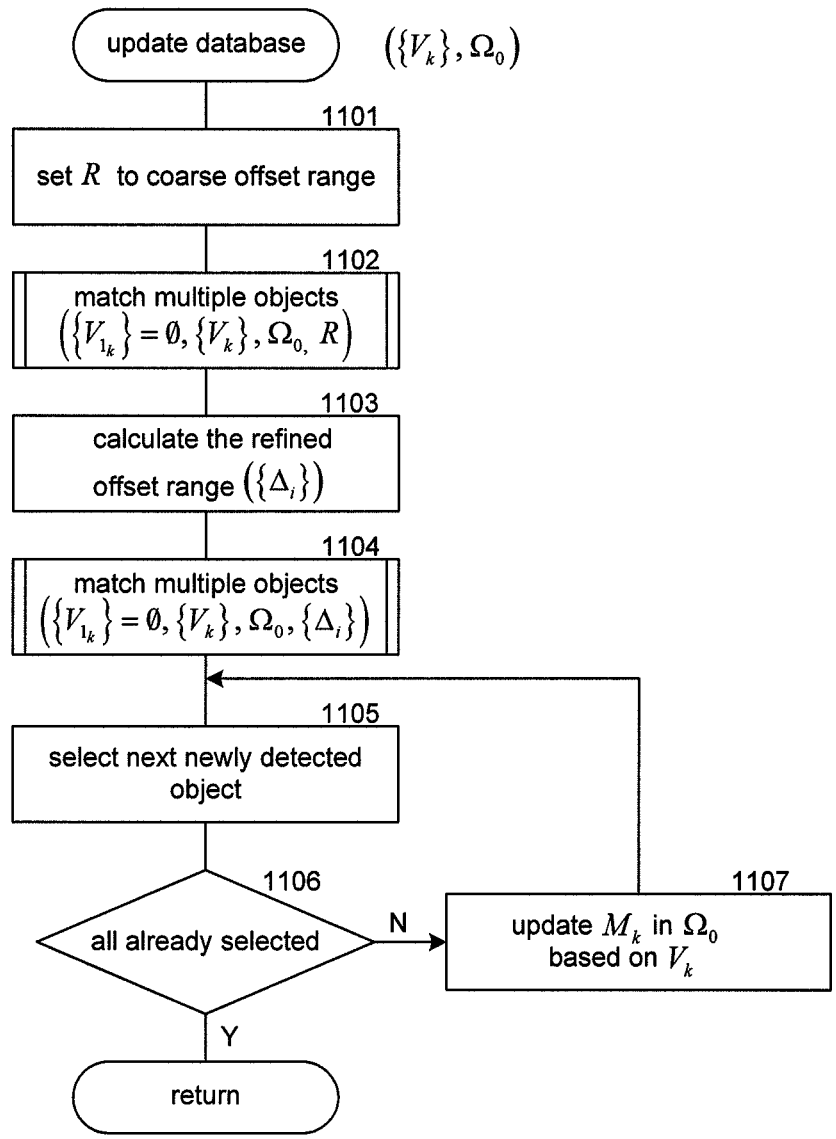
FIG. 11 is a flow diagram that illustrates the processing of the "update constellation database" component of the change detection system in some embodiments.

FIG. 11 is a flow diagram that illustrates the processing of the "update database" component of the change detection system in some embodiments. The component is passed an indication of the newly detected objects and a previous constellation and updates the previous constellation based on the newly detected objects. In block 1101, the component sets the offset range to the coarse offset range. In decision block 1102, the component invokes the "match multiple objects" component, passing along an indication of an empty new constellation, the newly detected objects, the previous constellation, and the coarse offset range and receives in return an indication of the best constellation offsets for the newly detected objects. In block 1103, the component calculates a refined offset range based on the best constellation offsets. In block 1104, the component invokes the "match multiple objects" component, passing along an indication of an empty new constellation, the new detected objects, the previous constellation, and the refined offset range. In block 1105, the component selects the next newly detected object. In block 1107, if all the newly detected objects have already been selected, then the component returns, else the component continues at block 1107. In block 1107, the component updates the previous constellation based on whether the selected newly detected object matches a previously detected object or whether it is a new object, and then loops to block 1105 to select the next newly detected object.

Figure 12:
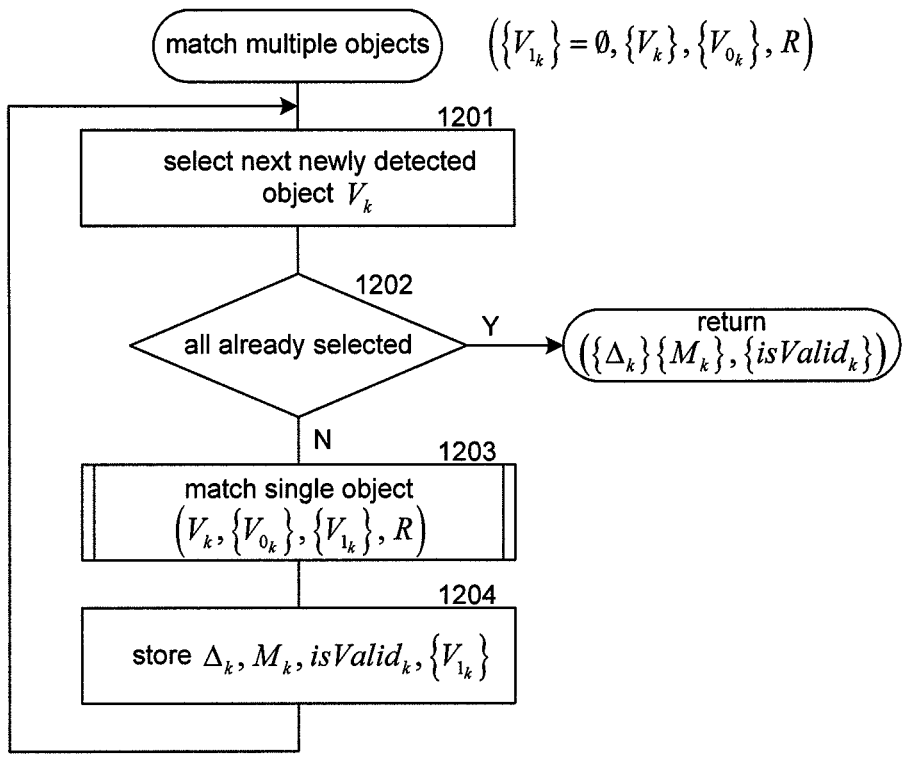
FIG. 12 is a flow diagram that illustrates the processing of the "match multiple objects" component of the change detection system in some embodiments.

FIG. 12 is a flow diagram that illustrates the processing of the "match multiple objects" component of the changed detection system in some embodiments. The component is passed an indication of an empty new constellation, the newly detected objects, a previous constellation, and an offset range and returns an indication of whether the point pattern match for each newly detected object was valid and an indication of the best constellation offsets and an indication of the previously detected objects that match each of the newly detected objects. In block 1201, the component selects the next newly detected object. In decision block 1202, if all the newly detected objects have already been selected, then the component returns, else the component continues at block 1203. In block 1203, the component invokes the match single object component passing an indication of the selected newly detected object, the already selected newly detected objects, the previous constellation, and the offset range. In block 1204, the component stores the best constellation offset, the matching previously detected object, the valid flag, and the updated new constellation that is returned by the invoked component, and then loops to block 1201 to select the next newly detected object.

From the foregoing, it will be appreciated that specific embodiments of the invention have been described herein for purposes of illustration, but that various modifications may be made without deviating from the scope of the invention. For example, if change detection need not be performed in real time, the change detection system may register the scan to the constellation database in a first pass and then perform change detection in a second pass in a manner similar to that described above for updating the database. As another example, the change detection system may be adapted to detect when a previously detected object is missing from the current scan by switching the roles of previously and newly detected objects as described above. Accordingly, the invention is not limited except as by the appended claims.

I claim:

1. A method in a computing device for matching a new constellation of newly detected objects to a previous constellation of previously detected objects, the method comprising:
    for each of a plurality of pairs that includes a previously detected object and a newly detected object,
        generating a constellation offset based on a distance between the previously detected object and the newly detected object of the pair; and
        generating a constellation matching score indicating a degree to which the new constellation matches the previous constellation assuming the constellation offset between the new constellation and the previous constellation and factoring in a probabilistic uncertainty model for the locations of the previously detected objects and the newly detected objects;
    identifying the constellation matching score indicating the best match between the new constellation and the previous constellation; and
    indicating that the constellation offset resulting in the identified constellation matching score as a best constellation offset for matching the new constellation with the previous constellation.

2. The method of claim 1 wherein generating the constellation matching score includes:
    for each newly detected object, generating a best object matching score indicating a best match with a previously detected object; and
    setting the constellation matching score based on the best object matching scores.

3. The method of claim 2 wherein the constellation matching score is set to an average of the best object matching scores.

4. The method of claim 2 wherein generating the best object matching score for a newly detected object includes:
    for each previously detected object, generating an object matching score indicating a degree of match between the newly detected object and the previously detected object; and
    selecting as the best object matching score the object matching score indicating the best match between the newly detected object and the previously detected object.

5. The method of claim 1 wherein the probability uncertainly model is based on a proximity likelihood.

6. The method of claim 5 wherein the proximity likelihood indicates a probability that the newly detected object matches a previously detected object based on the proximity of the objects.

7. The method of claim 1 wherein the constellation matching score factors in strength of detection for previously detected objects.

8. A computer-readable storage medium storing computer-executable instructions for controlling a computing device to detect a change in newly detected objects from previously detected objects, the computer-executable instructions implementing a method comprising:
    for a newly detected object,
        designating a new constellation to include newly detected objects within a match range of that newly detected object;
        designating a previous constellation to include previously detected objects with the match range of the newly detected object;
        matching the new constellation to the previous constellation to identify a best constellation offset based on constellation matching scores generated assuming different constellation offsets;
        selecting as a matching object the previously detected object that best matches that newly detected object, factoring in a best constellation offset; and
        generating a change statistic based on a comparison of values of an attribute of the matching object and the newly detected object.

9. The computer-readable storage medium of claim 8 wherein the change statistic is based on the difference between detection strength for the matching object from the constellation of previously detected objects and detection strength for the newly detected object divided by the detection strength for the matching object from the constellation of previously detected objects.

10. The computer-readable storage medium of claim 9 wherein the matching includes:
    for each of a plurality of pairs that includes a previously detected object of the previous constellation and a newly detected object of the new constellation,
        generating a constellation offset based on a distance between the previously detected object and the newly detected object of the pair; and
        generating a constellation matching score indicating a degree to which the new constellation matches the previous constellation, factoring in the constellation offset between the new constellation and the previous constellation; and
    identifying the constellation matching score that indicates the best match between the new constellation and the previous constellation; and
    indicating that the constellation offset resulting in the identified point pattern matching score is the best constellation offset for matching the new constellation with the previous constellation.

11. The computer-readable storage medium of claim 9 wherein the matching is valid only when more than a threshold number of newly detected objects of the new constellation match the previously detected object in the previous constellation at the best constellation offset.

12. The computer-readable storage medium of claim 11 wherein a change is not detected until after a threshold number of newly detected objects result in valid constellation matches.

13. The computer-readable storage medium of claim 11 wherein the matching uses a nominal range of admissible offsets to exclude pairs of a newly detected object and a previously detected object as a basis for a constellation match and refines the range of admissible offsets based on the best constellation offset as matches for newly detected objects are found.

14. The computer-readable storage medium of claim 13 wherein the range of admissible offsets is updated based on the median and median deviation of the best constellation offsets for newly detected objects.

15. A computing device for updating a previous constellation of previously detected objects based on a constellation of newly detected objects, comprising:

a component that, for each of the newly detected objects, performs a first point pattern match between newly detected objects within a match range of that newly detected object and previously detected objects within a match range of that newly detected object, the first point pattern match being performed using a nominal range of admissible offsets to exclude pairs that include a newly detected object and a previously detected object as a basis for a point pattern match, each point pattern match generating a best constellation offset;

a component that refines the range of admissible offsets based on a statistical value derived from the best constellation offsets; and a component that, for each of the newly detected objects, performs a second point pattern match between newly detected objects within a match range of the newly detected object and previously detected objects within a match range of the newly detected object, the point pattern match being performed using the refined range of admissible offsets to exclude pairs of a newly detected object and a previously detected object as a basis for a point pattern match; and a component that updates the previous constellation based on the second point pattern matches.

16. The computing device of claim 15 wherein the components that perform a point pattern match,
for each of a plurality of pairs that include a previously detected object and a newly detected object that lie within the range of admissible offsets,
generate a constellation offset based on the range of admissible offsets between the previously detected object and the newly detected object of the pair; and
generate a point pattern matching score indicating a degree to which newly detected objects within the match range match the previously detected object within the match range, factoring in the constellation offset;
identify the point pattern matching score indicating the best match; and
select the constellation offset resulting in the identified point pattern matching score being determined to be the best constellation offset.

17. The computing device of claim 16 wherein the component that generates the point pattern matching score,
for each newly detected object, generates a best object matching score indicating a best match with a previously detected object; and
sets the point pattern matching score based on the best object matching scores.

18. The computing device of claim 17 wherein the component that generates the point pattern matching score sets the point pattern matching score to an average of the best object matching scores.

19. The computing device of claim 15 wherein the component that updates the previous constellation adds a newly detected object to the previous constellation when the second point pattern match indicates that the newly detected object has no correspondence in the previous constellation.

20. The computing device of claim 15 wherein the component that updates the previous constellation sets a value of an attribute of each previously detected object that has a matching newly detected object to an average of the values of the attribute for each detection of the previously detected object.

21. The computing device of claim 15 wherein the component that refines the range of admissible offsets updates the range of admissible offsets based on a median and median deviation of the best constellation offsets resulting from performing the first point pattern match.

22. A computer-readable storage medium storing computer-executable instructions for controlling a computing device to match a new constellation of newly detected objects to a previous constellation of previously detected objects, the computer executable instructions comprising:
instructions that, for each of a plurality of pairs that includes a previously detected object and a newly detected object,
generate a constellation offset based on a distance between the previously detected object and the newly detected object of the pair; and
generate a point pattern matching score indicating a degree to which the new constellation matches the previous constellation assuming the constellation offset between the new constellation and the previous constellation and factoring in strength of detection of the previously detected objects;
instructions that identify the point pattern matching score indicating the best match between the new constellation and the previous constellation; and
instructions that indicate that the constellation offset resulting in the identified point pattern matching score as a best constellation offset for matching the new constellation with the previous constellation.

23. The computer-readable storage medium of claim 22 wherein the instructions that generate the point pattern matching score include instructions that:
for each newly detected object, generate a best object matching score indicating a best match with a previously detected object; and
set the point pattern matching score based on the best object matching scores.

24. The computer-readable storage medium of claim 23 wherein the point pattern matching score is set to an average of the best object matching scores.

25. The computer-readable storage medium of claim 23 wherein the instructions that generate the best object matching score for a newly detected object include instructions that:
for each previously detected object, generate an object matching score indicating a degree of match between the newly detected object and the previously detected object; and
select as the best object matching score the object matching score indicating the best match between the newly detected object and the previously detected object.

26. The computer-readable storage medium of claim 22 wherein the point pattern matching score factors in a probabilistic uncertainty model for the locations of the previously detected objects and the newly detected objects.

27. The computer-readable storage medium of claim 26 wherein the probabilistic uncertainly model is based on a proximity likelihood.

28. The computer-readable storage medium of claim 27 wherein the proximity likelihood indicates a probability that the newly detected object matches a previously detected object based on the proximity of the objects.

29. A computer-readable storage medium storing computer-executable instructions for controlling a computing device to match a new constellation of newly detected objects to a previous constellation of previously detected objects, the computer executable instructions comprising:
instructions that, for each of a plurality of pairs that includes a previously detected object and a newly detected object for which the distance between the previously detected object and the newly detected object of the pair lies within a range of admissible offsets, generate a constellation offset based on the distance; and generate a point pattern matching score indicating the degree to which the new constellation matches the previous constellation assuming a constellation offset between the new constellation and the previous constellation and factoring in strength of detection for the previously detected objects;

instructions that identify the point pattern matching score indicating the best match between the new constellation and the previous constellation; and instructions that indicate that the constellation offset resulting in the identified point pattern matching score as a best constellation offset for matching the new constellation with the previous constellation.

30. The computer-readable storage medium of claim 29 wherein the range of admissible offsets specifies that the distance is within a designated offset range.

31. The computer-readable storage medium of claim 29 wherein a relative uncertainty in location of previously detected objects is typically significantly smaller than the distance between the previously detected objects.

32. The computer-readable storage medium of claim 29 wherein by not generating a point pattern matching score for pairs that do not lie within the range of admissible offsets, the computational efficiency of matching the new constellation to a previous constellation can be reduced from 4th order polynomial time to a 3rd order polynomial time.

\* \* \* \* \*